United States Patent
Volovsek et al.

(10) Patent No.: US 11,013,176 B2
(45) Date of Patent: May 25, 2021

(54) BAGGER FOR STAND-ON MOWER

(71) Applicant: THE TORO COMPANY, Bloomington, MN (US)

(72) Inventors: Ryan J. Volovsek, Inver Grove Heights, MN (US); Timothy J. Clift, Lino Lakes, MN (US)

(73) Assignee: THE TORO COMPANY, Bloomington, MN (US)

( * ) Notice: Subject to any disclaimer, the term of this patent is extended or adjusted under 35 U.S.C. 154(b) by 0 days.

(21) Appl. No.: 16/814,468

(22) Filed: Mar. 10, 2020

(65) Prior Publication Data
US 2020/0205344 A1 Jul. 2, 2020

Related U.S. Application Data

(63) Continuation of application No. 15/685,494, filed on Aug. 24, 2017, now Pat. No. 10,624,265.

(60) Provisional application No. 62/382,510, filed on Sep. 1, 2016.

(51) Int. Cl.
*A01D 43/063* (2006.01)
*A01D 101/00* (2006.01)

(52) U.S. Cl.
CPC ....... *A01D 43/0636* (2013.01); *A01D 43/063* (2013.01); *A01D 2101/00* (2013.01)

(58) Field of Classification Search
CPC .............. A01D 43/0636; A01D 43/063; A01D 2101/00; A01D 34/63; A01D 43/0635; A01D 42/00; A01D 43/06; A01D 34/71; A01D 34/49
See application file for complete search history.

(56) References Cited

U.S. PATENT DOCUMENTS

| | | | |
|---|---|---|---|
| 2,747,356 A | 5/1956 | Peterson | A01D 43/063 56/16.6 |
| 3,492,800 A * | 2/1970 | Peterson | A01D 43/063 56/202 |
| 3,494,116 A | 2/1970 | Lempke | A01D 43/063 56/202 |
| 3,553,947 A | 1/1971 | Root | A01D 43/063 56/202 |
| 3,657,865 A | 4/1972 | Ober | |
| 3,736,736 A | 6/1973 | Myers | A01D 43/0633 15/78 |
| 3,816,986 A | 6/1974 | Van Der Gaast | |
| 3,844,615 A | 10/1974 | Anderson | |
| 3,872,656 A | 3/1975 | Dahl | |

(Continued)

OTHER PUBLICATIONS

U.S. Appl. No. 62/382,510, filed Sep. 1, 2016, Volovsek et al.

(Continued)

*Primary Examiner* — Arpad Fabian-Kovacs
(74) *Attorney, Agent, or Firm* — Mueting Raasch Group

(57) ABSTRACT

A bagger attachment for use with a stand-on lawn mower. The bagger includes, in some embodiments, an impeller, a duct, and one or more bags which are covered by a hood. The hood is attached to a pivot frame that allows movement of the hood between open and closed positions. The bagger attachment may also include a frame assembly that facilitates mounting and removal of the bagger attachment from the mower. The bagger attachment may either contain removable bags, or may include a discharge door for dumping the clippings.

19 Claims, 14 Drawing Sheets

(56) References Cited

U.S. PATENT DOCUMENTS

| | | | |
|---|---|---|---|
| 3,881,304 A | 5/1975 | Lempke | A01D 43/063 37/243 |
| 3,884,020 A | 5/1975 | Dahl et al. | |
| 3,925,968 A | 12/1975 | Wagenhals | |
| 3,958,401 A | 5/1976 | Carpenter | |
| 3,961,467 A | 6/1976 | Carpenter | |
| 4,054,023 A | 10/1977 | Carpenter | |
| 4,069,649 A | 1/1978 | Mullet et al. | |
| 4,103,477 A | 8/1978 | Mullet et al. | |
| 4,259,832 A | 4/1981 | DuRay | |
| 4,306,408 A | 12/1981 | Christopherson et al. | |
| 4,310,998 A | 1/1982 | Cuba | |
| 4,393,645 A | 7/1983 | Moore | A01D 43/063 56/16.6 |
| 4,476,668 A | 10/1984 | Reilly | |
| 4,487,007 A | 12/1984 | Mullet et al. | |
| 4,523,788 A | 6/1985 | Prasad | |
| 4,532,755 A | 8/1985 | Schemelin | A01D 43/063 56/16.6 |
| 4,532,756 A | 8/1985 | Merkel | |
| 4,569,187 A | 2/1986 | Spiker et al. | |
| 4,589,249 A | 5/1986 | Walker et al. | |
| 4,637,202 A | 1/1987 | Lamusga | |
| 4,665,684 A | 5/1987 | DiPaolo | A01D 43/063 56/16.6 |
| 4,709,541 A | 12/1987 | Broman et al. | |
| 4,723,398 A | 2/1988 | Flenniken | A01D 43/063 56/16.6 |
| 4,796,322 A | 1/1989 | Steed et al. | |
| 4,922,696 A | 5/1990 | Burns et al. | |
| 4,972,666 A | 11/1990 | Peruzzo | |
| 4,984,420 A | 1/1991 | Samejima et al. | |
| 5,018,346 A | 5/1991 | Ishimaru et al. | |
| 5,036,650 A | 8/1991 | Tesch | A01D 43/06 56/16.6 |
| 5,074,106 A | 12/1991 | Di Paolo | A01D 43/063 56/202 |
| 5,193,882 A | 3/1993 | Gamaldi | |
| 5,307,613 A | 5/1994 | Delery | |
| 5,457,946 A | 10/1995 | Deitrick | |
| 5,778,648 A | 7/1998 | Parkes et al. | |
| 6,012,273 A | 1/2000 | Ogasawara et al. | |
| 6,044,634 A | 4/2000 | Velke | A01D 43/063 56/16.6 |
| 6,089,006 A | 7/2000 | Langford et al. | |
| 6,098,740 A | 8/2000 | Abend | A01D 34/6806 180/305 |
| 6,105,350 A | 8/2000 | Vachon et al. | |
| 6,155,034 A * | 12/2000 | Velke | A01D 43/063 56/16.6 |
| 6,226,970 B1 | 5/2001 | Busboom | A01D 43/063 56/16.6 |
| 6,272,818 B1 | 8/2001 | Sebben | A01D 43/0631 56/10.2 R |
| 6,513,312 B1 | 2/2003 | Ishimori et al. | |
| 6,546,710 B1 | 4/2003 | DeHart | A01D 43/063 56/199 |
| 6,584,757 B2 | 7/2003 | Komorida et al. | |
| 6,910,322 B2 | 6/2005 | Schroeder et al. | |
| 7,032,368 B2 | 4/2006 | Funk et al. | |
| 7,121,072 B1 | 10/2006 | Dimarco | A01D 43/063 56/202 |
| 7,325,755 B2 | 2/2008 | Pugh | |
| 7,942,224 B2 * | 5/2011 | Marshall | A01D 67/04 180/89.13 |
| 8,915,347 B2 | 12/2014 | Hoppel | |
| 9,021,776 B2 * | 5/2015 | Zwieg | A01D 34/74 56/17.1 |
| 9,055,714 B2 | 6/2015 | Hoppel | |
| 9,107,343 B1 | 8/2015 | Gaeddert | A01D 43/06 |
| 9,137,947 B2 | 9/2015 | Hoppel | |
| 9,226,445 B2 * | 1/2016 | DeHart | A01D 43/06 |
| 9,414,541 B2 * | 8/2016 | Hoppel | B65G 47/18 |
| 9,603,303 B2 | 3/2017 | Hoppel | |
| 9,629,309 B2 | 4/2017 | Hoppel | |
| 9,844,181 B2 | 12/2017 | Hoppel | |
| 10,058,030 B2 | 8/2018 | Hoppel | |
| 2002/0038537 A1* | 4/2002 | Umemoto | A01D 34/6806 56/13.3 |
| 2003/0010005 A1 | 1/2003 | Jerome | A01D 43/0631 56/12.8 |
| 2003/0019201 A1 | 1/2003 | Eavenson, Sr. | A01D 43/063 56/202 |
| 2004/0237493 A1 | 12/2004 | Schroeder | A01D 43/06 56/320.2 |
| 2008/0202089 A1 | 8/2008 | Kanai | A01D 43/063 56/199 |
| 2012/0177306 A1 | 7/2012 | Dehart | A01D 43/0636 383/22 |
| 2013/0160415 A1 | 6/2013 | Ronning | A01D 43/077 56/13.3 |
| 2014/0174838 A1 | 6/2014 | Oswald | A01D 34/001 180/6.24 |
| 2014/0311863 A1 | 10/2014 | Hoppel | |
| 2015/0068178 A1 | 3/2015 | Hoppel | |
| 2015/0237800 A1 | 8/2015 | DeHart | A01D 43/06 56/202 |
| 2015/0274225 A1 | 10/2015 | Pugh et al. | |
| 2015/0274226 A1 | 10/2015 | Pugh et al. | |
| 2016/0014962 A1 | 1/2016 | Hoppel | |
| 2016/0021823 A1 | 1/2016 | Hoppel | |
| 2016/0052567 A1 | 2/2016 | Pugh et al. | |
| 2016/0183464 A1 | 6/2016 | Hoppel | B65G 47/18 56/11.1 |
| 2017/0127613 A1 | 5/2017 | Cracraft | A01D 43/063 |
| 2017/0150677 A1 | 6/2017 | Hoppel | |

OTHER PUBLICATIONS

"Bad Boy Mower Part MZ Series Side Bagger" Web page [online]. [retrieved on Nov. 5, 2018]. Retrieved from the Internet: <URL: https://www.badboylawnmowerparts.com/Bad-Boy-Mowers-MZ-Series-Side-Bagger-p/mzsidebagger.htm>. Believed to be available no later than May 4, 2016; 2 pages.

Exmark Manufacturing Company, Incorporated, "Ultra Vac Lazer Z® HP Models," For Serial Nos. 510,000 & Higher, Part No. 103-8853. Operator's Manual. Exmark Manufacturing Company, Incorporated, Copyright 2000-2004; 24 pages.

Exmark Manufacturing Company, Incorporated, "Ultra Vac® QDS Frontrunner™ Models," For Ultra Vac Serial Nos. 720,000 & Higher, Part No. 4500-274 Rev. A, Operator's Manual. Exmark Manufacturing Company, Incorporated, Copyright 2006-2008; 24 pages.

Exmark Manufacturing Company, Incorporated, "Ultra Vac™ QDS Lazer Z® HP Models," For Serial Nos. 440,000 & Higher, Part No. 103-6281 Rev. A, Operator's Manual. Exmark Manufacturing Company, Incorporated, Copyright 2000-2004; 24 pages.

Exmark Manufacturing Company, Incorporated, "Quest® Bagger," For Ultra Vac Serial Nos. 313,000,000 & Higher (To fit Quest™ Serial Nos. 920,000 & Higher), Part No. 4501-567 Rev. A, Operator's Manual. Exmark Manufacturing Company, Incorporated, Copyright 2012; 28 pages.

Goodyear "Spiraflex® Grassvac™ Vacuum Hose," Product Catalog. The Goodyear Tire & Rubber Company. Catalog #06-130. Copyright 2006; p. 182.

Grasshopper Mowers: Products: Attachments & Accessories/ Vacuum Collection Systems, datasheet [online], The Grasshopper Company, Moundridge, KA 67107, Copyright 2000 [retrieved on Feb. 11, 2002]. Retrieved from the Internet: <URL:http://www.grasshoppermower.com/products/FrontMount_Acc/vacuum/vacuum_MAN.html>: 3 pages.

"Take in the Grass Introducing the Shortcut™ BAC-VAC™," Hustler Commercial and Industrial Turf Equipment, [online]. [Retrieved on Feb. 11, 2002]. Retrieved from the Internet: <URL: http://www.hustlerturfequipment.com/scbacvac.htm>: 1 page.

The Toro Company, "Quiet Collector Wheel Horse® Lawn and Garden Tractor Attachment," Model No. 78200-Serial No. 220000001

(56) References Cited

OTHER PUBLICATIONS and Up; Form No. 3327-580 Rev A, Operator's Manual. The Toro Company, Copyright 2002; 24 pages.
The Toro Company, "Groundsmaster® 3280-D Accessories," datasheet, The Toro Company, Copyright 2013; 2 pages.
Pictures of Groundsmaster® 3280-D Grass Collection System. The Toro Company. Product available at least as early as 2013; 1 page.
The Toro Company, "15 Cubic Foot Bagger Kit—Groundsmaster," Model No. 30356-Serial No. 311000001 and Up; Form No. 3368-722 Rev B, Parts Catalog. The Toro Company, Copyright 2013; 16 pages.
Wikipedia—Cordura, [online]. [Retrieved on Dec. 18, 2018]. Retrieved from the Internet: <URL: https://en.wikipedia.org/wiki/Cordura>: 2 pages.
"Document 1," 2 Photographs of Scag V-Ride II Mower with Grass Collection System taken on Oct. 18, 2018; Green Industry & Equipment Expo, Kentucky Exposition Center, Louisville, KY. Oct. 17-19, 2018; 2 pages.
"V-ride bagger" LawnSite.com website. Available at least as early as Apr. 23, 2014. Retrieved from the Internet on Nov. 6, 2020: <lawnsite.com/threads/v-ride-bagger.423910/>; 7 pages.
"Wright Stander: Parts List for 36" and 42" Machines" Wright Manufacturing, Inc., Copyright 1998-2001. Available at least as early as Feb. 2001. Retrieved from the Internet on Dec. 28, 2020: <wrightmowers.co.uk/wp-content/uploads/2016/01/Stander_WS_Small-Frame_Pre-Serial-No-20303.pdf>; 13 pages.
"Accelerator Grass Catcher" Lawnsite.com website. Available at least as early as Jun. 4, 2017. Retrieved from the Internet on Dec. 28, 2020: <https://www.lawnsite.com/threads/accelerator-grass-catcher.469106/>; 5 pages.
"Gear Up for the Season 2012," Gardner Florida International—Early Summer Program Brochure, Retrieved from the Internet on Dec. 28, 2020: <https://www1.gardnerinc.com/intl/pdf/promo-Intl%202012%20Early%20Summer%20Program.pdf;> 25 pages.

\* cited by examiner

BAGGER FOR STAND-ON MOWER

RELATED APPLICATION(S)

This application is a continuation application of U.S. patent application Ser. No. 15/685,494, filed Aug. 24, 2017, which claims the benefit of U.S. Provisional Application No. 62/382,510, filed Sep. 1, 2016, each of which is incorporated herein by reference in its entirety.

TECHNICAL FIELD

Embodiments of the present disclosure relate to a side-mounted bagging apparatus and a mounting assembly for removably attaching the bagging apparatus to a lawn mower. More particularly, embodiments of the present disclosure relate to a removable bagger for a stand-on mower.

BACKGROUND

Landscape contractors and homeowners often remove grass clippings and/or leaves from their lawns in order to achieve an attractive, healthy, and well-manicured landscape. Clippings are generated with each mowing session, and the volume of clippings may be compounded by infrequent mowing. If the clippings are not removed promptly, they may mat down and prevent light from reaching the underlying grass. As a result, clippings are often collected in a receptacle referred to as a grass "catcher" or "bagger."

Commercial crews strive to complete lawn maintenance chores in a quick and efficient manner. If the crew must stop a mower frequently to empty the mower's grass bagger, the crew's efficiency and profitability may suffer. Solving this problem with an excessively large grass bagger, however, may adversely affect the mower's maneuverability and performance.

Landscape contractors often use stand-on or sulky mowers, which include an operator platform that is attached to (or, in case of a sulky, towed behind) the mower. Agile stand-on mowers allow turf to be mowed in an efficient, relatively quick manner as compared to some walk-behind and conventional riding mowers.

However, stand-on mowers often lack a bagger and instead distribute the grass clippings back to the ground surface (e.g., via side discharge or mulching modes). If a stand-on mower has any type of bagger, it is typically of relatively small capacity. Moreover, some stand-on mower grass catchers are mounted in a way that is unwieldy and/or difficult to use.

One bagger option for a stand-on mower is a bagger assembly located on the front of the mower frame, e.g., above the cutting deck. However, this type of design may impede the operator's view of the area to be mowed. In addition, a front bagger design may generate dust in the vicinity of the operator. Such front-mounted baggers may also alter mower dynamics as the bagger fills.

Riding mowers may include rear-mounted baggers that extend transversely across the width of the mower, generally behind the operator's seat. However, a rear-mounted bagger on a stand-on mower could be disadvantageous in that it increases the machine's footprint (something that stand-on mowers seek to minimize) and may surround the operator on three sides: the mower's control tower in front of the operator; a duct or conduit extending along one side of the operator; and the rear-mounted bagger behind the operator.

SUMMARY

Embodiments described herein may provide a grass catcher or bagger with one or more grass collecting bags beneath a hood. The bagger apparatus may be mounted on the mower's side, rather than on the mower's front or rear. After the bags fill with grass clippings, the operator removes the bags from beneath the hood for emptying. The operator may dump the clippings into a truck bed or trailer, and then reinstall the empty bags beneath the hood to catch and collect more grass clippings. In an alternative embodiment, the bagger dumps the clippings onto the ground, street, or parking lot for later retrieval by a commercial vacuum or the like.

Embodiments of the present disclosure provide a receptacle or bagger for use with an outdoor power equipment machine such as a mower. The bagger apparatus or grass catcher may have: one or more bags that are removably mounted on the machine's frame for collecting grass clippings, leaves and the like; a hood that covers the bags and that is easily moveable between open and closed positions; and an impeller assembly and duct for moving clippings from the cutting deck to the bagger. One embodiment allows the operator to remove full bags of clippings and replace empty bags onto the bagger apparatus. Another embodiment allows clippings to be dumped onto the ground at an appropriate location.

In still another embodiment, the bagger is mountable to a traction frame, which may be a utility vehicle, mower, tractor, or the like. The bagger apparatus may comprise: a mounting frame assembly that fixedly connects the bagger to a side of the traction frame; one or more flexible bags beneath a hood, wherein each bag is sized and configured to collect clippings; and a pivot frame that attaches the hood to the traction frame. With this design, the bagger is mounted to one (e.g., right) side of the traction frame, and the pivot frame allows movement of the hood between a closed position and an open position. Another embodiment of the inventive bagger comprises: a hopper that is connected to a cutting deck of a mower, wherein one wall of the hopper forms a planar discharge door, the door being rotatable such that the plane of the door in the open position is about 90 degrees from the plane of the door in the closed position.

When embodiments of the bagger are mounted to a stand-on mower, the bagger is preferably positioned on one side of the mower and operator platform. The relatively lightweight bagger assembly does not interfere with the mower's normal operation, and may not obstruct the operator's forward view. As such, the bagger facilitates mowing in close areas, under low-hanging shrubbery, around tight turns, and along sidewalks, paths, curbs, trees and edging. Moreover, the bagger's weight distribution contributes to a well-balanced machine.

Baggers in accordance with embodiments of the present disclosure may utilize a compact footprint that facilitates storage of the machine in the operator's garage, warehouse, or shop, and facilitates transport of the machine on trailers or trucks. Since storage and transportation expenses can be high, the compact size may result in cost savings for the owner.

Despite its compact size, the inventive bagger is sized and configured to collect a relatively large volume of clippings. As a result, the operator can complete the mowing process in an efficient manner because the operator may empty the bagger less frequently.

The operator may save time due to several bagger features, including the mounting frame assembly that removably attaches the bagger to the mower or traction frame. The bagger can be quickly and easily removed and later re-attached. In addition, an attachment mechanism may be included that releasably couples one end of a duct to an inlet on the bagger's hood, such that the duct transports the cutting deck's grass clippings to the bagger. The hood's releasable attachment mechanism may not require the use of any tools, and the duct may remain attached to the hood even as the hood pivots between open and closed positions. Also, embodiments of the inventive bagger include a unique pivotal spring mechanism for easily opening and closing the bagger's hood. Another embodiment of the bagger includes an effective mechanism for positioning a discharge door to permit the clippings to descend by gravity when emptying.

These and other advantages of the present disclosure will become readily apparent upon further review of the specification and drawings. The above summary is not intended to describe each embodiment or every implementation. Rather, a more complete understanding of illustrative embodiments will become apparent and appreciated by reference to the following Detailed Description and claims in view of the accompanying figures of the drawing.

BRIEF DESCRIPTION OF THE DRAWINGS

Embodiments of the present disclosure will be described hereafter in the Detailed Description, taken in conjunction with the following drawings, in which like reference numbers refer to like elements or parts throughout.

DETAILED DESCRIPTION

Figure 1:
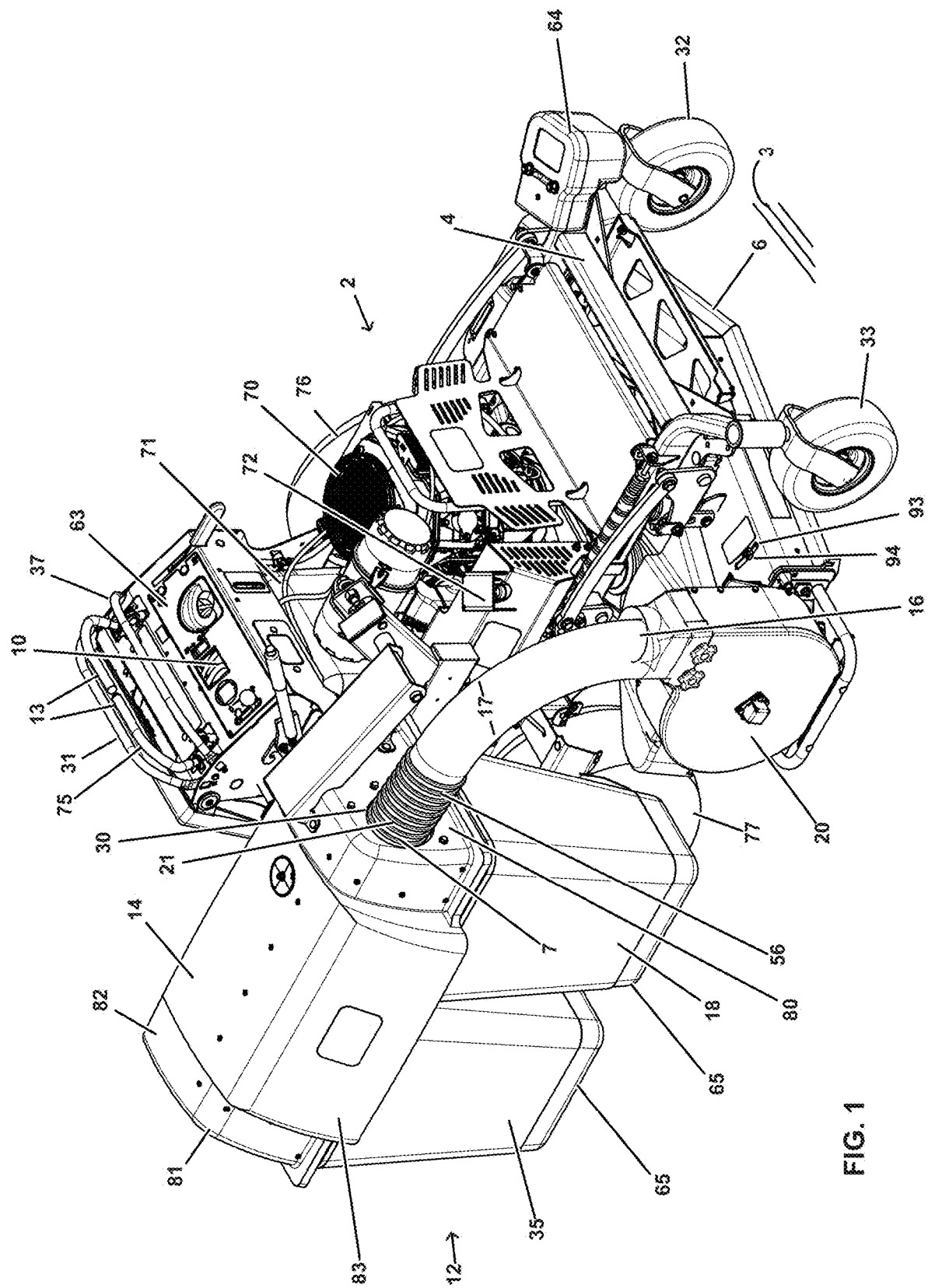
FIG. 1 is a perspective view of a utility vehicle (e.g., stand-on mower) with an attached bagger apparatus in accordance with embodiments of the present disclosure, viewed from the front, right corner of the mower.

In the following detailed description of illustrative embodiments, reference is made to the accompanying figures of the drawing which form a part hereof. It is to be understood that other embodiments, which may not be described and/or illustrated herein, are certainly contemplated. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the mower.

Referring now to the figures, a bagger apparatus for use with a stand-on utility vehicle such as a lawn mower in accordance with embodiments of the present disclosure is shown by way of example only.

A first embodiment of the inventive grass bagger apparatus is illustrated as 12 in the FIGS. 1-10. The bagger apparatus or "bagger" 12 is installed on a power unit or mower 2, which has a traction frame 4 adapted for movement across a ground surface 3 to be mowed. As shown in the figures, the mower may be a ride-on vehicle accommodating a standing operator (i.e., a stand-on mower). However, such a configuration is not limiting as other embodiments may be adapted for use with other riding or walk-behind vehicles.

Figure 2:
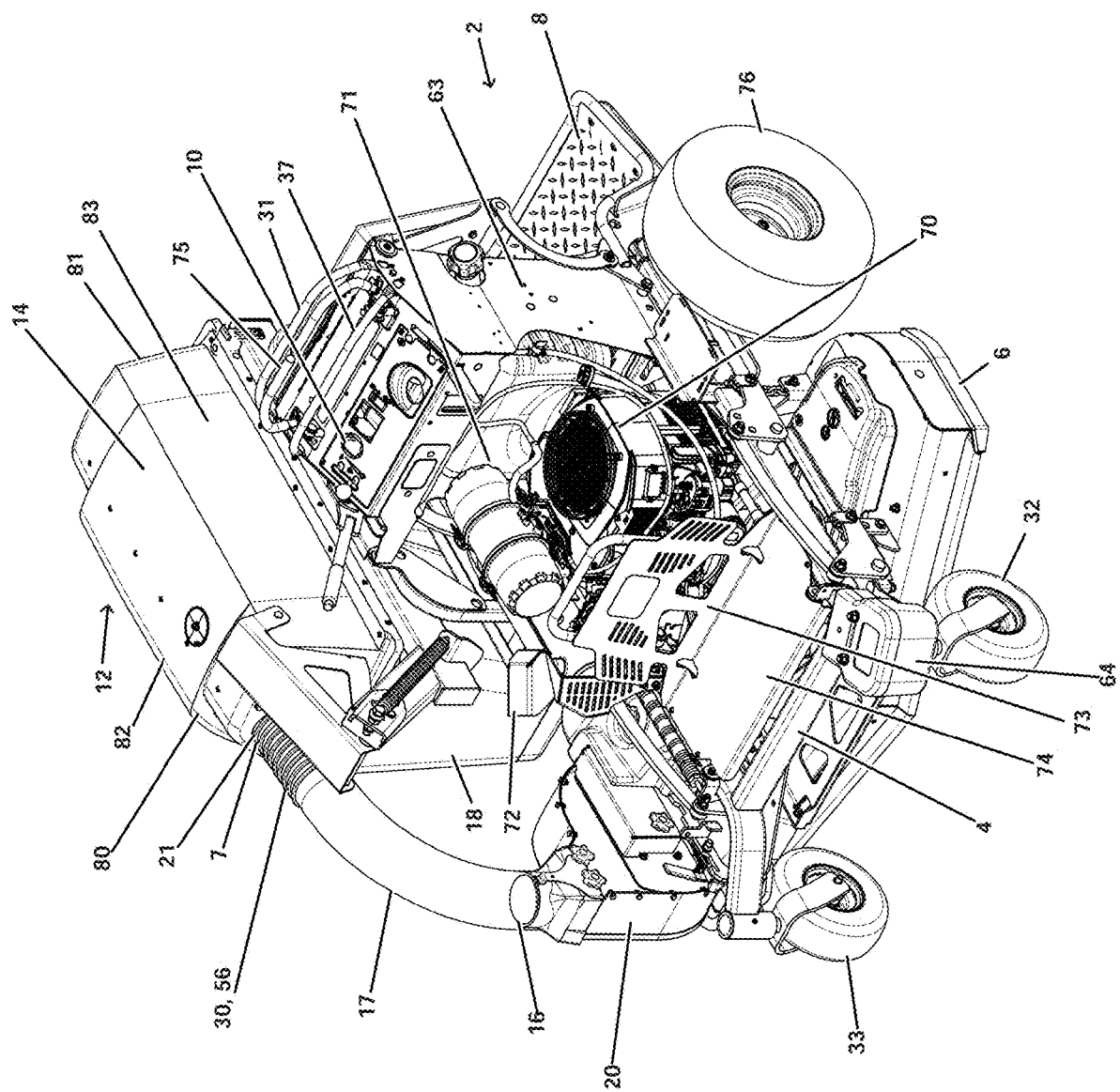
FIG. 2 is a perspective view of the mower and bagger apparatus of FIG. 1 viewed from the front left corner.

One or more grass collecting receptacles (e.g., bags 18, 35) may be attached to a mounting frame assembly 57 (see FIG. 6) of the bagger 12. In the illustrated embodiment, the bags 18, 35 are positioned under a selectively movable hood 14. FIGS. 1 and 2 illustrate a stand-on mower 2 having two bags: a front bag 18 and a rear bag 35. Preferably, the bagger 12 directs grass clippings directly into the bags 18, 35. In one embodiment, each bag 18, 35 may contain a flexible liner or yard waste bag (not shown). Each bag 18, 35 may also include four walls constructed from a flexible fabric material, such as nylon, or nylon-cotton blend. Each bag or receptacle 18, 35 may thus include a front and back wall, and an interior and exterior side wall. In a preferred embodiment, the interior wall 92 (see FIG. 5) of each bag 18, 35 is made of a strong, flexible fabric such as Cordura®, which is a brand name for fabrics used in products such as luggage, backpacks, military wear etc. Each bag 18, 35 has a bottom portion or pan 65 that is formed from a relatively rigid and waterproof material. In one embodiment, bagger 12 has a total capacity for clippings of 5-8 bushels, e.g., 6 bushels. In one embodiment, the bagger 12 weighs about 160 pounds and is capable of containing about 180 pounds of grass clippings, dry leaves, and other lawn debris.

The portable power unit 2 is referred to herein as a "mower" for the purpose of simplicity, but the unit 2 may serve many types of functions besides cutting grass. Instead of a cutting deck 6, unit 2 may support a wide variety of attachments having a variety of purposes, such as mulching leaves, plowing snow, vacuuming leaves, removing debris, sweeping dirt, and other purposes. Attachments for accomplishing these functions would include mulchers, snow blowers, vacuums, sweepers, brooms, sprayers, blades, buckets, forks, brushes, and chippers. Such attachments may be mounted on various locations on the unit 2. The bagger 12 may be used to collect the output from these different types of attachments. Such output from a mower or other device is referred to as "clippings" herein. The term "clippings" and "grass clippings" may refer to debris containing one or more of grass, leaves, debris, dust, etc.

In the illustrated embodiment, wherein the power unit is configured as a mower 2, the cutting deck 6 is mounted near a front or middle of the traction frame 4, wherein the mower/traction frame include a front end (or portion), rear end (or portion) spaced-apart or otherwise offset from the front end along a longitudinal axis 11 (see FIG. 4) of the mower/traction frame, and two opposite (e.g., left and right) sides or side portions. While the construction may vary, the traction frame 4 may be made of tubular steel members and support several standard components regardless of the type of attachment supported by the traction frame. These standard components typically include a prime mover such as an electric motor or internal combustion engine 70, fuel tank 71, muffler 72, and hydraulics (not shown). As shown in FIG. 2, the traction frame 4 may also include an engine guard having a vertical portion 73 and a horizontal portion 74.

The traction frame 4 may also support a control tower 63 extending vertically upward from the traction frame. Behind the control tower 63 is a standing operator platform 8 upon which the operator may stand while mowing or performing other operations. The platform 8 may include a suspension system (not shown) to improve operator comfort. In the illustrated embodiment, the platform 8 is positioned near the rear of the traction frame 4 (e.g., at or aft of a rotational axis of the rear wheels), generally behind the cutting deck 6. The platform 8 is preferably hinged to be moveable between a folded, vertical position (not shown) and a horizontal position (shown in FIG. 2). The vertical position may be used when the operator walks behind the machine 4 during its operation, i.e., when the operator converts the machine to a walk-behind configuration. Although baggers in accordance with embodiments of the present disclosure are primarily described with respect to a stand-on mower, those of skill in the art will recognize that embodiments of the present disclosure may accommodate attachment to walk-behind and ride-behind (e.g., sulky) vehicles without departing from the scope of this disclosure. Moreover, baggers like those described herein could be adapted to a conventional (e.g., sit-on) riding mower in which the operator is seated at an appropriate position along the traction frame 4.

The cutting deck 6 houses one or more rotary blades (not shown), and the width of the cutting deck may be configured for the operator's desired width. For example, a deck having a cutting width of 48 inches, 52 inches, 60 inches, or 72 inches may be carried by the mower 2. As is known in the art, the blades may rotate in a generally horizontal plane to cut grass and thereby create grass clippings, and/or to mulch grass and other lawn debris (e.g., leaves) into small pieces for deposit back to the ground surface. The height of the cutting deck 6 can be adjusted up or down by means of a linkage system (not shown).

A control panel 10 may also be included, e.g., near the top of the control tower 63, and provide various controls that allow the operator to operate the mower 2. The controls 10 may include reference bars 31, 37, which limit forward and reverse movement of left and right steering control levers 13. As a safety precaution, the controls 10 also include an operator presence control (OPC) bar 75, which may be incorporated into one or more of the control levers 13. As is known in the art, the OPC bar 75 must be engaged in order for the mower 2 to operate.

The mower 2 may also include a baffle (not shown) associated with the cutting deck that controls the extent to which the cuttings are mulched/discharged. The baffle may include a movable plate that adjusts the size of the discharge outlet (not shown) of the cutting deck 6. In the illustrated embodiment, a cover is provided above the cutting deck that includes a slot 93 accommodating a protruding fastener 94 (see FIG. 1). The fastener 94 is moveable within the slot 93 so as to provide adjustability of the effective size of the discharge outlet/baffle.

Rather than positioning the fastener 94 on or near the cutting deck 6, a remote baffle control lever may be provided, e.g., on the control panel 10 that allows the operator to adjust the degree to which the clippings are mulched or bagged. The latter design would allow the mulching adjustment to be accomplished while the mower 2 is being operated. While variations are certainly possible, the operator could adjust the baffle control lever to: select all clippings to be bagged; select all of the clippings be recycled back to the turf (mulching); or select some setting between these two settings. Of course, the actual degree to which cuttings are bagged and mulched may depend upon other factors, e.g., the condition and moisture content of the turf, the weather, the length and type of grass, the preference of the turf owner, etc. In certain areas of the turf, it may be desirable to collect and bag a greater percentage of clippings, whereas other areas of the turf may benefit from a greater degree of mulching.

If the baffle opening is rather large, then a greater percentage of clippings will be directed to the bagger 12. If the baffle opening is relatively small, then the baffle will force a greater percentage of clippings to be mulched/recycled, i.e., shredded to smaller pieces and dropped onto the ground. Once again, baffle adjustment can be done with tools from above (or underneath) the cutting deck 6, or from a control provided, for example, at the control panel 10.

The traction frame 4 may be supported for rolling engagement with the ground surface by left and right front caster wheels 32, 33 and left and right rear traction wheels 76, 77. In the illustrated embodiment, the rear traction wheels or drive wheels 76, 77 are powered by the engine 70 and rotate about a common rotational axis (see, e.g., axis 19 of FIG. 4), whereas the front caster wheels 32, 33 are non-powered and are adapted to swivel about a vertical axis under the influence of the drive wheels and the topology of the turf surface.

In the illustrated embodiment, the operator platform 8 is positioned longitudinally behind and transversely between the traction wheels 76, 77. With this design, the operator's weight counteracts, to some degree, the weight of the engine 70 and mower deck 6. In one embodiment, the platform 8 may be located above and centered along the transverse rotational axis 19 of the traction wheels 76, 77 (see FIG. 4). While illustrated with some degree of specificity, those of skill will understand that other drive and steering arrangements are certainly possible. For instance, the traction frame 4 may be supported by more or fewer wheels (e.g., a tri-wheel configuration). Also, the front wheel(s) may, in additionally, or alternatively, be driven. Moreover, the front wheels could be actively steered (as opposed to passively cantering) and/or the rear wheels could be steerable. As a result, the specific configuration of the mower 2 may vary without departing from the scope of this disclosure.

With this introduction, various embodiments of the bagger 12 are now described. Once again, while described and illustrated with some degree of specificity, it is to be understood that the described/illustrated embodiments are exemplary only and other configurations are certainly possible.

In one embodiment, the bagger 12 is positioned on the right side of the traction frame 4, as viewed from the operator's perspective. In such a configuration, the left side of the mower 2 may function as the mower's trim edge, i.e., the side of the mower 2 that moves along various areas such as the edge of a building, sidewalk, tree, landscaping edging, etc. Accordingly, the operator maintains a clear view of the trim edge, and the bagger is sized and configured such that trimming is accomplished effectively along the left side of the mower 2.

In one embodiment, the bagger 12 is located proximate the control tower 63 and operator platform 8 on the right side of the traction frame 4. The bagger 12 may be rigidly fixed to a mounting frame assembly 57 (see FIG. 6) that is attached to the traction frame 4 (e.g., to one side portion of the frame such as the control tower 63) such that it is partially located outboard of one of the rear drive wheels 76, 77. In one embodiment, the distance between the ground and a top wall or surface 82 of the hood 14 is approximately four feet. The height of the bagger 12 is relatively low to increase stability and visibility, while at the same time being high enough to provide bags 18, 35 with a sufficiently high capacity.

An upper end of the bagger 12 may be defined by the hood 14. The hood 14 is, in one embodiment, made of a rigid, durable material. As shown in FIGS. 1-4, hood 14 has a front surface 80, a rear surface 81, the top surface 82, and inner and outer longitudinal walls 83. The top wall 82 of the hood 14 has a generally rectangular shape with a longitudinal axis of the hood being generally parallel to a path of travel of the mower 2 (when traveling straight-ahead). With this design, the center of gravity of the bagger 12 is at a longitudinal location that is proximate, e.g., in-line with, the axis 19 (see FIG. 4) of the of the rear traction wheels 76, 77.

Figure 3:
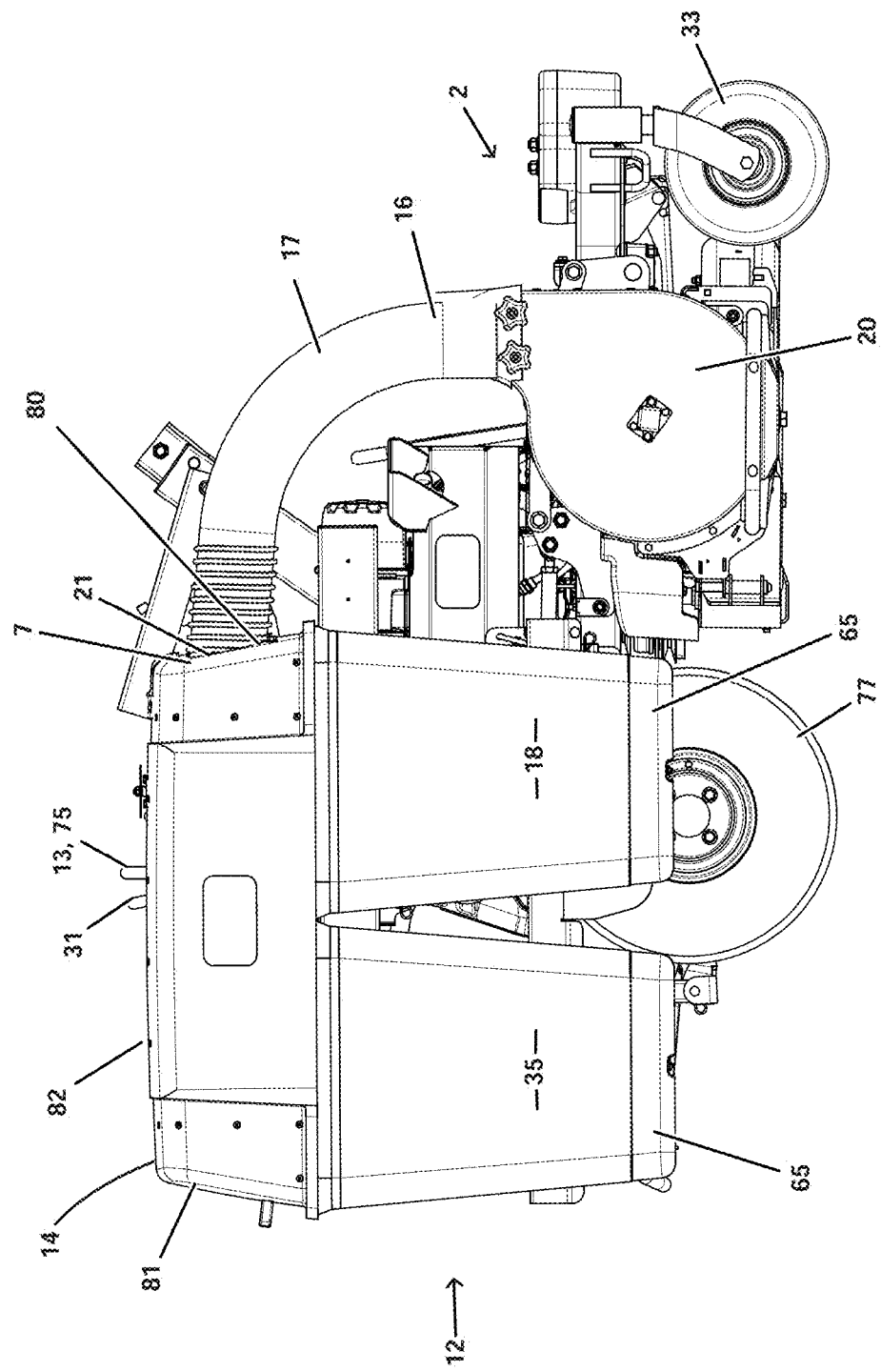
FIG. 3 is a right side elevational view of the mower and bagger apparatus of FIG. 1.

As shown in FIG. 3, the bagger 12 may be positioned behind the cutting deck 6 and to the side of the operator platform 8. The bagger 12 is positioned relatively far forward to contribute to desirable weight distribution of the mower 2, but is also located to reduce possible interference with the cutting deck 6.

The walls 80, 81, 82 and 83 may form a channel inside the hood 14. The underside of the top wall 82 and side wall 83 may include a perforated plate (not shown) to permit air to escape from the hood 14. The perforations are sized small enough to prevent grass clippings from escaping through the hood 14.

The front wall 80 of the hood 14 contains a port or grass bagger inlet 7 which allows the clippings to enter the channel at the top of the hood 14 and fall into the front and rear collecting bags 18, 35. From time-to-time during mower operation, the operator opens the hood 14, removes the collecting bags 18, 35 from beneath the hood 14, and dumps the collected grass clippings. The operator may then replace the empty bags 18, 35 beneath hood 14 and continue mower operation.

The bagger 12 may also include an impeller assembly 20, located, for example, near the front, right corner of the traction frame 4, e.g., near the discharge outlet of the deck 6. In one embodiment, the impeller assembly 20 has a generally vertical orientation (that is, the impeller rotates about a horizontal transverse axis). The impeller assembly 20 may be surrounded by a housing, and the housing is preferably mounted on a vertical support member or peg (not shown).

The impeller assembly 20 may include an impeller having centrifugal, radial blades (not shown) that have a generally vertical orientation. A belt and pulley assembly drives and controls rotation of the impeller. This bagger 12 design maintains the position of the mower blade belts so that the belts need not be removed when the impeller assembly is removed from the traction frame 4. After the operator removes a single impeller drive belt, the impeller assembly 20 is rotated outwardly and then lifted off of the vertical support member (not shown) of the traction frame 4 (or alternatively, the cutting deck 6). A latch may be provided to permit rotation of the impeller assembly 20 about the peg when the impeller assembly 20 is removed or attached, along with the other components of the bagger 12. Depending on the width of the cutting deck 6, the impeller may utilize different pulleys, mounting plates (not shown), etc.

As shown in FIGS. 1 and 2, the traction frame 4 may also support one or more counterweights 64, which may be positioned on the front left corner of the traction frame when the bagger 12 is installed. The counterweight 64, which is constructed of cast steel or another suitable material, partially offsets the weight of the bagger 12 and impeller assembly 20 on the mower 2.

An elongated conduit or duct 17 may connect the cutting deck 6 to the inlet 7 of the bagger hood 14. The impeller assembly 20 may assist in propelling the grass clippings through the duct 17. The front end 16 of the duct 17 attaches to the outlet of the impeller assembly 20 in any suitable way, e.g., by using a hose clamp to tighten the front end 16 of duct 17 to the outlet of the impeller assembly 20.

As the clippings approach the impeller assembly 20, they will be influenced by a deflector member (not shown) inside the impeller assembly such that the clippings are guided into and through the duct 17. The impeller of the impeller assembly 20, which again may rotate about a horizontal transverse axis, may permit a duct 17 of shorter length than a vertical axis impeller, thus permitting a decreased discharge distance from the impeller assembly 20 to the inlet 7 of the bagger 12. That is, the impeller blades of the impeller assembly 20 may function as a flow director that redirect the grass clippings' path of travel essentially 90 degrees, i.e., from a direction generally horizontal and transverse to the traction frame 4, to a direction generally vertical and rearward as it travels upward and through the duct 17.

Figure 4:
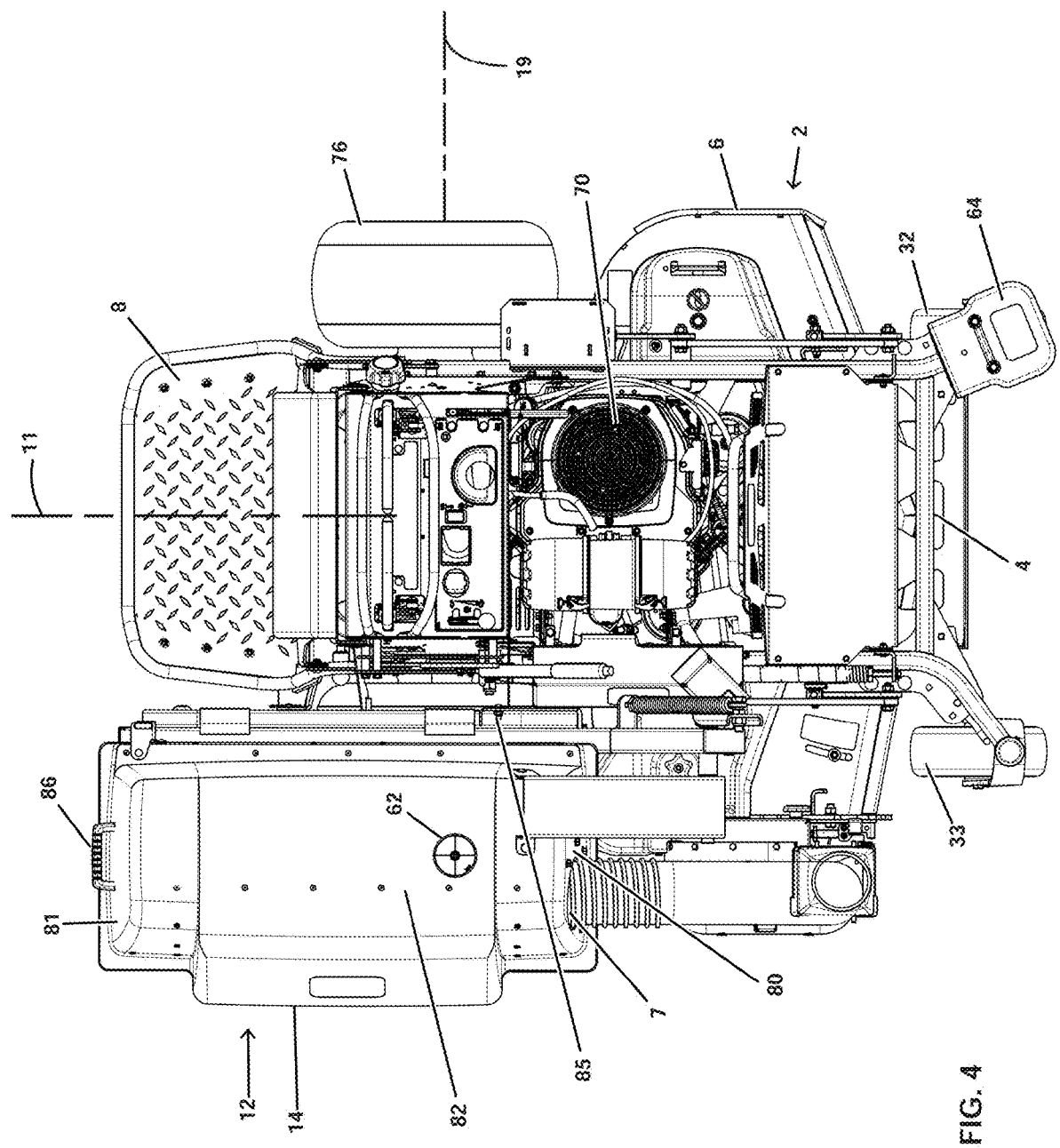
FIG. 4 is a top plan view of the mower and bagger apparatus of FIG. 1.

The discharge duct 17 carries the clippings from the cutting deck 6 to the inlet 7 of the bagger hood 14, which may in some embodiments be cylindrical in shape to receive the cylindrical duct. In one embodiment, the duct 17 is made from a material such as Grass Vac™ hose sold by Goodyear Tire and Rubber Company of Akron, Ohio, USA for lawn, leaf, mulch and yard waste collection applications. As shown in FIGS. 1-3, the duct 17 has a gradual, long radius bend, and the majority of the duct 17 is made of a relatively flexible material. As shown in FIG. 4, the inlet 7 is located at or near a midpoint of the front wall 80 of the hood 14.

A rear end 21 of the duct 17 includes a flexible portion 56 having a helical rib 30 (see FIG. 2) on the exterior surface of the duct 17 (while not shown in the figures, the rib may, in some embodiments, extend along most or all of the duct 17 length). The rear end 21 of duct 17 is attached to the inlet 7 as shown. The inlet 7 is sized and configured such that the inlet 7 can tightly receive the outer diameter of the flexible portion 56.

Figure 7:
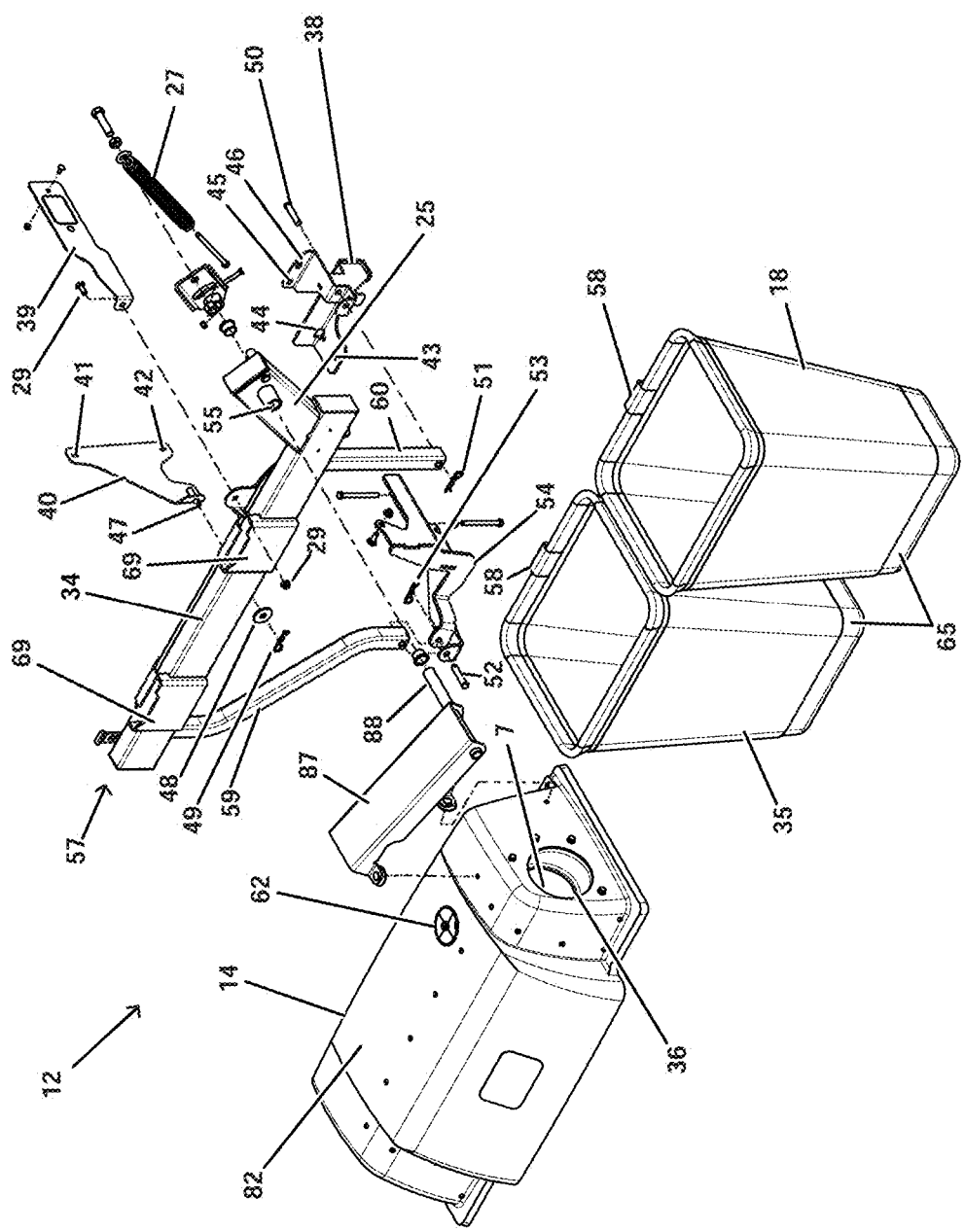
FIG. 7 is a partial exploded, perspective view of the bagger apparatus of FIG. 1 showing exemplary components.

The inlet 7 comprises a short tube or pipe that is recessed behind the front wall 80 of the hood 14. The inlet 7 may include a helical thread 36 that threadably mates with the rib 30 on the duct 17, as shown in FIG. 7. In this embodiment, the inlet 7 is attachable to the rear end 21 of the duct 17 in such a way that the operator need not use any fasteners, such as a screwdriver, to attach and detach the duct 17 from the inlet 7.

Alternatively, the inlet 7 could comprise a pipe or tube that sticks outside of the front wall 80 of the hood 14, with the rear end 21 of the duct 17 being slid onto the tube. A hose clamp (not shown) or similar device adapted for releasably coupling the rear end 21 of the duct 17 to the inlet 7 may alternatively be provided. Such a clamp may have a tightening screw that may be tightened by the operator once attached.

Debris plugging may sometimes occur during operation of the bagger 12, e.g., when the bags 18, 35 and hood 14 become excessively full of clippings. If a grass plug develops, the operator can easily disconnect the duct 17 from the bagger 12 merely by rotating the rear end 21 of the duct counter-clockwise relative to the inlet 7, thereby breaking the attachment between the two. Once the grass plug is cleared, the attachment can be reestablished by rotating the rear end 21 of the duct 17 clockwise back into the inlet 7.

An optional feature of the bagger 12 is a fill indicator 62 (see FIGS. 4-5), which may, in one embodiment, be mounted on the top surface 82 of the hood 14. The indicator may form a visible, rotatable signal disk connected to an upper end of a journaled shaft protruding above the top wall 82. A lower end of the shaft is connected to a radial horizontal fan, which is located below the top wall 82 of the hood 14. In one embodiment, air movement through the system causes the fan to rotate as the bags 18, 35 fill with clippings. The fan may, in one embodiment, be approximately six inches in diameter and include a plurality of fan blades.

During mower operation, the rear bag 35 typically fills first, after which the front bag 18 fills with clippings. The fill indicator 62 may have a flat, circular shape and the upper surface of the indicator 62 may have a distinctive design or color scheme positioned in the operator's sight line from the operator platform 8. When the bag 18 is full of clippings, the reduced airflow causes the fan to slow or stop rotating, which correspondingly causes the fill indicator 62 to stop spinning. Because the indicator 62 is positioned relatively close to the operator, the operator may have a clear view of the indicator and thus observe when the indicator 62 stops rotating. A stationary indicator 62 signals to the operator a level of clippings in the bags 18,35, e.g., that the bagger 12 is full of clippings and ready to be emptied. As a result, the fill indicator 62 may decrease the likelihood of a grass plug forming in the bagger 12.

Figure 8:
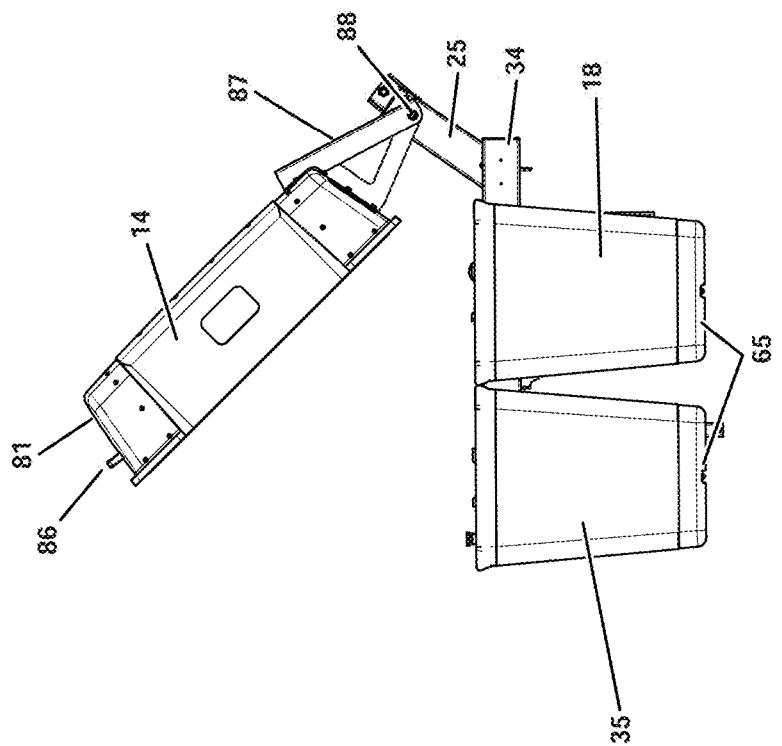
FIG. 8 is a side elevational view of an exemplary bagger apparatus with a hood of the apparatus shown in an open position.

When the hood 14 is opened or otherwise moved to the open position shown in FIG. 8, the operator may remove the bags 18, 35. In the illustrated embodiment, the hood may rotate up to an open position as shown in FIG. 8, wherein the hood's longitudinal axis remains generally in the same vertical plane as it occupied when the hood was in a closed position (shown in FIG. 9).

A latch (not shown) on the rear wall 81 of the hood 14 may be provided to secure the hood 14 in the closed position (again, see FIG. 9) to prevent inadvertent movement or bouncing of the hood 14 relative to the bags 18, 35 as the traction frame 4 travels over the ground surface. The latch is movable between an engaged position, in which the latch latches the hood in the closed position, and a disengaged position, in which the latch is released to allow the hood to move to the open position.

As shown in FIGS. 5-10, the bagger 12 also includes a bagger mounting frame assembly 57 (supporting the bags 18, 35) that may be releasably attached to the traction frame 4, e.g., to the control tower 63 and/or other portion of the frame 4. In some embodiments, the mounting frame assembly 57 may removably attach to brackets or mounts that are in turn attached (e.g., permanently) to the traction frame 4. In some embodiments, the traction frame may receive these brackets without requiring alteration.

Figure 6:
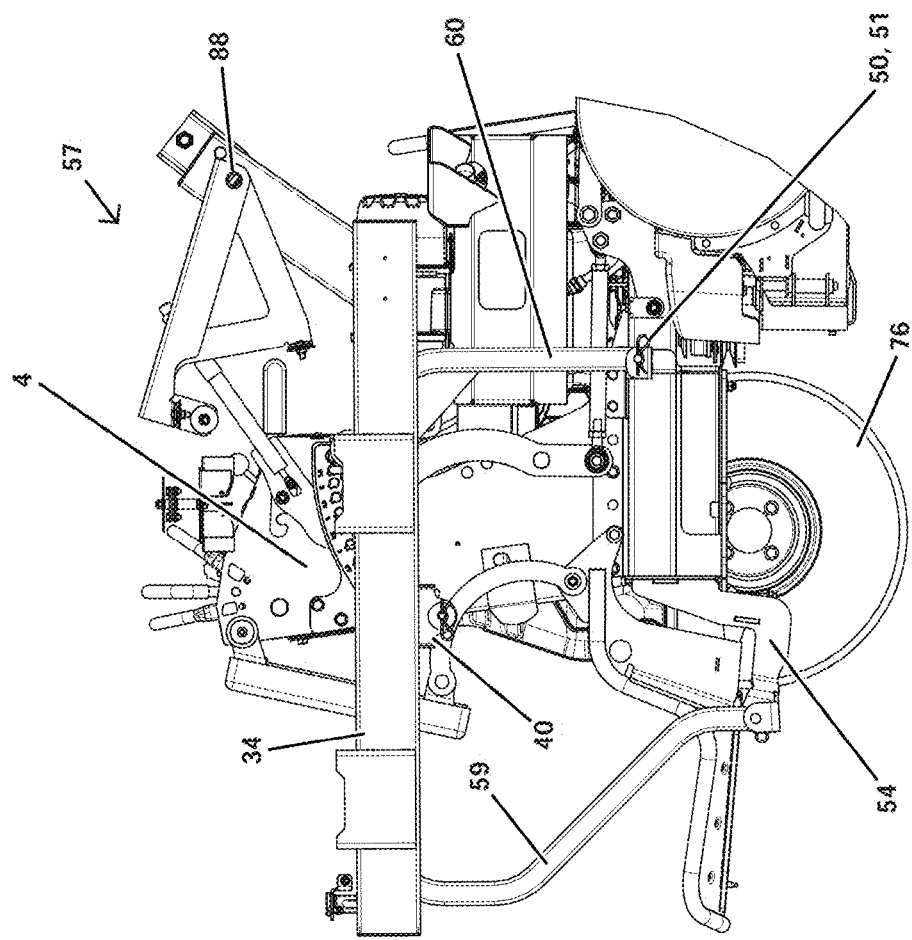
FIG. 6 is a partial side elevational view of a mounting frame assembly for a bagger apparatus in accordance with embodiments of the present disclosure, as mounted on the right side of a mower.

In the illustrated embodiments, the mounting frame assembly 57 may include a substantially horizontal and longitudinally oriented beam 34 as illustrated in FIGS. 6-7. The frame assembly 57 may attach to the traction frame 4 via various mounts or brackets as described above. For example, as shown in FIG. 7, a lower front bracket or mount 38 may be attached to the traction frame 4 (e.g., using four fasteners passing through bolt holes 43, 44, 45, and 46. The lower front mount 38 may support a lower front mounting pin 50 that passes through (or is integral with) the mount 38 and also through the mounting frame assembly 57 as shown in FIG. 7 to support a forward or front end or portion of the frame assembly 57. The mounting frame assembly 57 may then be secured relative to the lower front mount 38 (to the pin 50) with a cotter pin 51.

Figure 5:
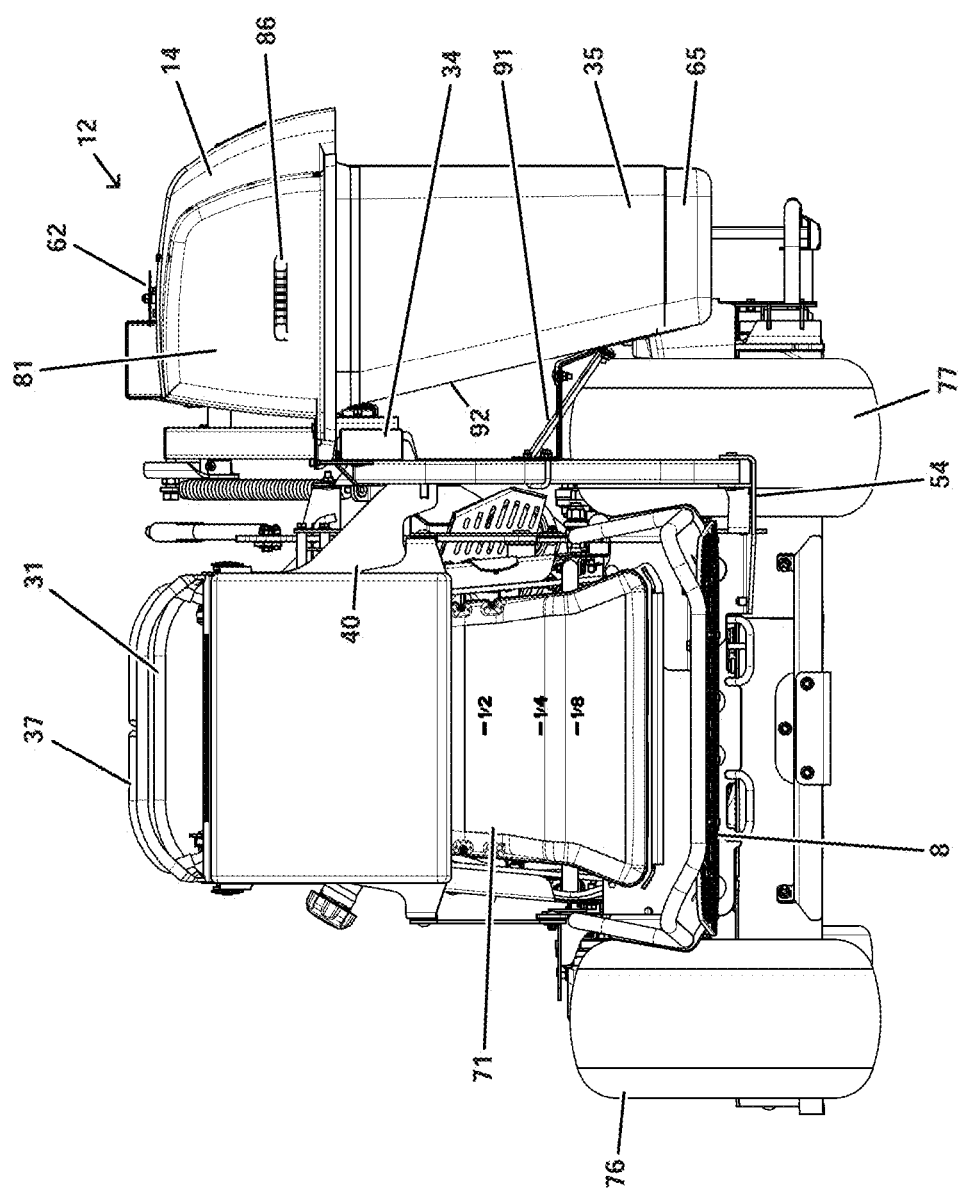
FIG. 5 is a rear elevational view of the mower and bagger apparatus of FIG. 1.

FIGS. 5 and 6 show rear and side views, respectively, of the exemplary mounting frame assembly 57 including the beam 34. As shown in FIG. 7, the frame assembly 57 may further include a lower rear bracket or mount 54 (e.g., which may be secured to the traction frame 4 with three fasteners or bolts) to support a rear end of the beam 34 (via a strut 59). The lower rear mount 54 may support the frame assembly 57 via a lower rear mounting pin 52. The lower rear mount 54 and mounting pin 52 may, in some embodiments, be located behind the rear traction wheels 76, 77 (e.g., behind the rear wheel axis of rotation 19 (see FIG. 4)) as is evident in FIG. 6. A cotter pin 53 may be used to secure the frame assembly 57 to the pin 52.

For clarity, and to show the bagger mounting frame assembly 57 more clearly, FIG. 6 excludes the hood 14, bags 18, 35, the right drive wheel 77, a bag guard assembly 91, and related structure.

In the illustrated embodiments, the frame assembly 57 may also attach to the traction frame 4 via an upper front bracket or mount 39, and an upper rear bracket or mount 40. The upper front mount 39 may utilize a pin and cotter as already describe herein, or could alternatively use a bolt and nut 29 as shown in FIG. 7.

The upper rear mount 40 may be mounted to the control tower 63 with two bolts (not shown) via bolt holes 41, 42. The upper rear mount 40 may support an upper rear mounting pin 47. Once the frame assembly 57 is mounted onto the pin 47, the frame assembly 57 may be secured relative thereto using a washer 48 and cotter pin 49. The mounting pins 50, 52, and 47 may line up with suitable apertures and mounting hardware to permit ease of attachment of the frame assembly 57.

FIG. 6 shows the lower rear mount 54 pinned to the rear strut 59. The bagger mounting frame 57 may also include a forward strut 60 to which the lower front mounting pin 50 is received (see also FIG. 7).

To support the hood 14 in pivotal relation to the mounting frame assembly 57, the assembly 57 may include a pivot frame or arm 87 adapted to pivot about a journal 55 forming a pivot 88. The journal 55 may be supported on a rail 25 that protrudes from the beam 34 as shown in FIG. 7. Pivoting of the hood 14 between the open and closed positions is described in more detail below.

The mounting frame assembly 57 further includes the bag guard assembly 91 (see, e.g., FIG. 5). The assembly 91 is a generally rectangular plate that is positioned vertically above the traction wheel 77 and assists in preventing portions of the bags 18, 35 from contacting or interfering with the traction wheel 77.

If the operator does not wish to use the bagger 12, he/she may remove the bagger 12 from the traction frame 4. Removal of the bagger 12 from the traction frame 4 generally converts the mower 2 into a side discharge (or mulching) configuration.

In the illustrated embodiments, the operator may, when bagging is no longer desired, remove the bags 18, 35 and the mounting frame assembly 57 from the mower 2. The blower 20 may also be removed and replaced with a discharge chute (not shown) if desired. Grass clippings may then be ejected from the right side of the mower cutting deck 6. As described above, a baffle may be used to choose what percentage of clippings are ejected and what may be recycled/mulched.

To remove the bagger 12, the operator may stop and secure the mower 2 (e.g., stop the engine). The operator may then remove the bagger 12 from the traction frame 4, by removing the appropriate fasteners, which in the illustrated embodiments, include removal of the three cotter pins 49, 51, and 53 from the pins 47, 50, and 52, respectively. The bolt/nut 29 may also be removed from the front upper mount 29 as shown in FIG. 7.

The bagger 12 is designed to permit the operator to convert the mower 2 from a bagging configuration, in which the bagger apparatus is installed and operative, to a side discharge/mulching configuration, in which the bagger is removed from the traction frame 4. To accomplish this conversion, the operator may, in one embodiment, execute the following procedure: (1) separate (e.g., unlatch or unscrew) the front end of the duct 17 from the deck impeller outlet; (2) remove the duct 17 (e.g., by rotating the rear end 21 of the duct 17 counter-clockwise out of engagement with the hood adapter 7); (3) lower the cutting deck 6 to the lowest height-of-cut position; (4) unlatch the belt cover over the mower pully assembly; (5) remove the blower belt from the mower pully assembly; (6) open the blower assembly and remove it from the pivot hole; (7) disengage and remove the mounting frame assembly 57 and its attached bagger components; and (8) attach side discharge chute and any necessary deflectors, covers or guides to the outlet of the cutting deck 6.

The seventh of the above steps, the removal of the bagger mounting frame assembly 57 from the traction frame 4, may involve the following sub-steps: (1) disengage the cotter pin 49 from the mounting pin 47; (2) disengage the cotter pin 51 from the mounting pin 50; (3) disengage the cotter pin 53 from the mounting pin 52; and (4) disengage bolt/nut 29 from the upper front mount 39.

In order to convert from a side discharge configuration back to a bagger configuration, the operator may, in one embodiment, reverse the above steps as indicated by the following procedure: (1) remove discharge deflector or guard if installed on cutting deck outlet; (2) install the bagger mounting brackets 38, 39, 40, and 54 if not already in place; (3) position the bagger 12 (i.e., frame assembly 57) on its back; (4) slide frame assembly 57 to align rear strut 59 with lower mounting bracket 54 and then pin into place using pin 52 and cotter pin 53; (5) rotate the bagger 12 up on the lower bagger mounting bracket; (6) align the holes on the bagger frame assembly with the holes on the other mounting brackets; (7) install the pins and secure the frame assembly in place with the cotter pin and fasteners (described above); (8) install the impeller assembly 20 on the mower 2, and close the impeller assembly 20; (9) route the blower belt (not shown) into the impeller assembly 20; (10) install the flexible portion 56 of the duct 17 into the bagger opening 7, and confirm that the attachment forms a secure seal; (11) install the lower, front portion 16 of the duct 17 onto the outlet for the impeller assembly and secure the attachment with a hose clamp or another type of fastener arrangement; and (12) install any front weights and caster weights, including all related fasteners.

Figure 9:
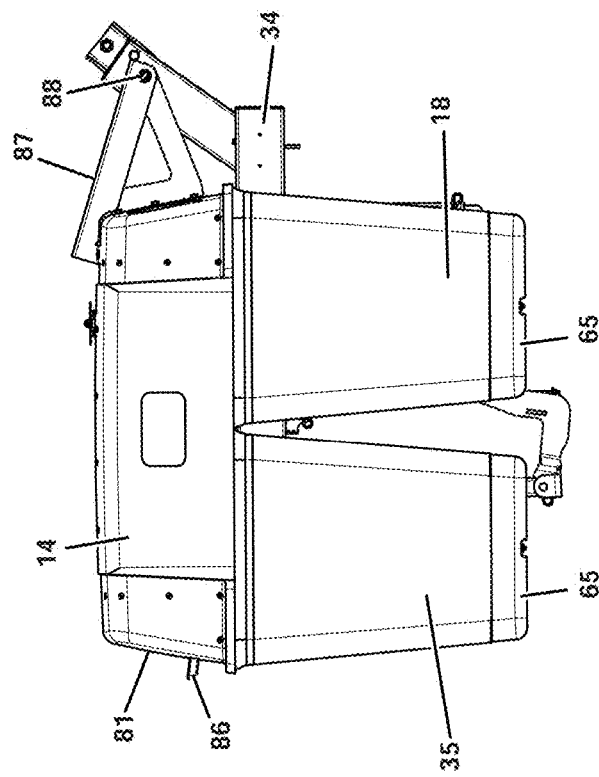
FIG. 9 is a side elevational view similar to FIG. 8, but with the hood shown in a closed position.
Figure 10:
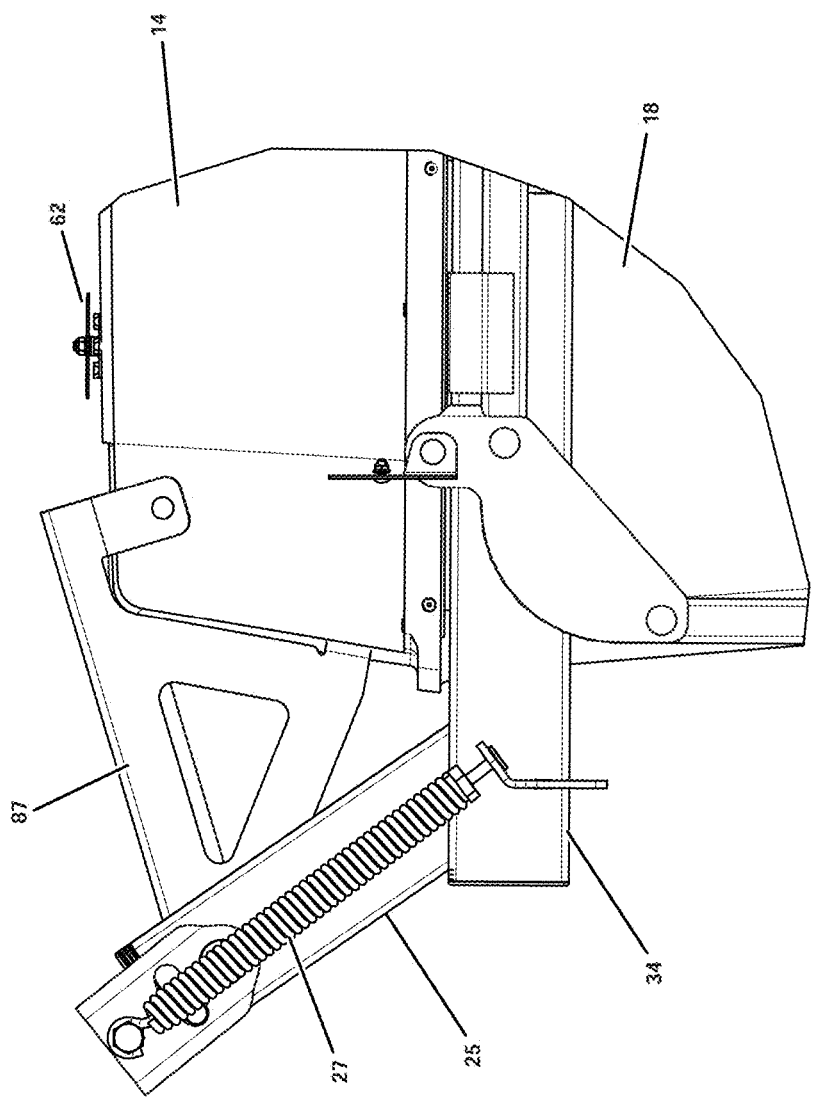
FIG. 10 is an enlarged side elevational view of an exemplary pivot frame connecting the hood with the remaining bagger apparatus, with the hood shown in the closed position, and viewed from the opposite side as FIG. 9.
Figure 11:
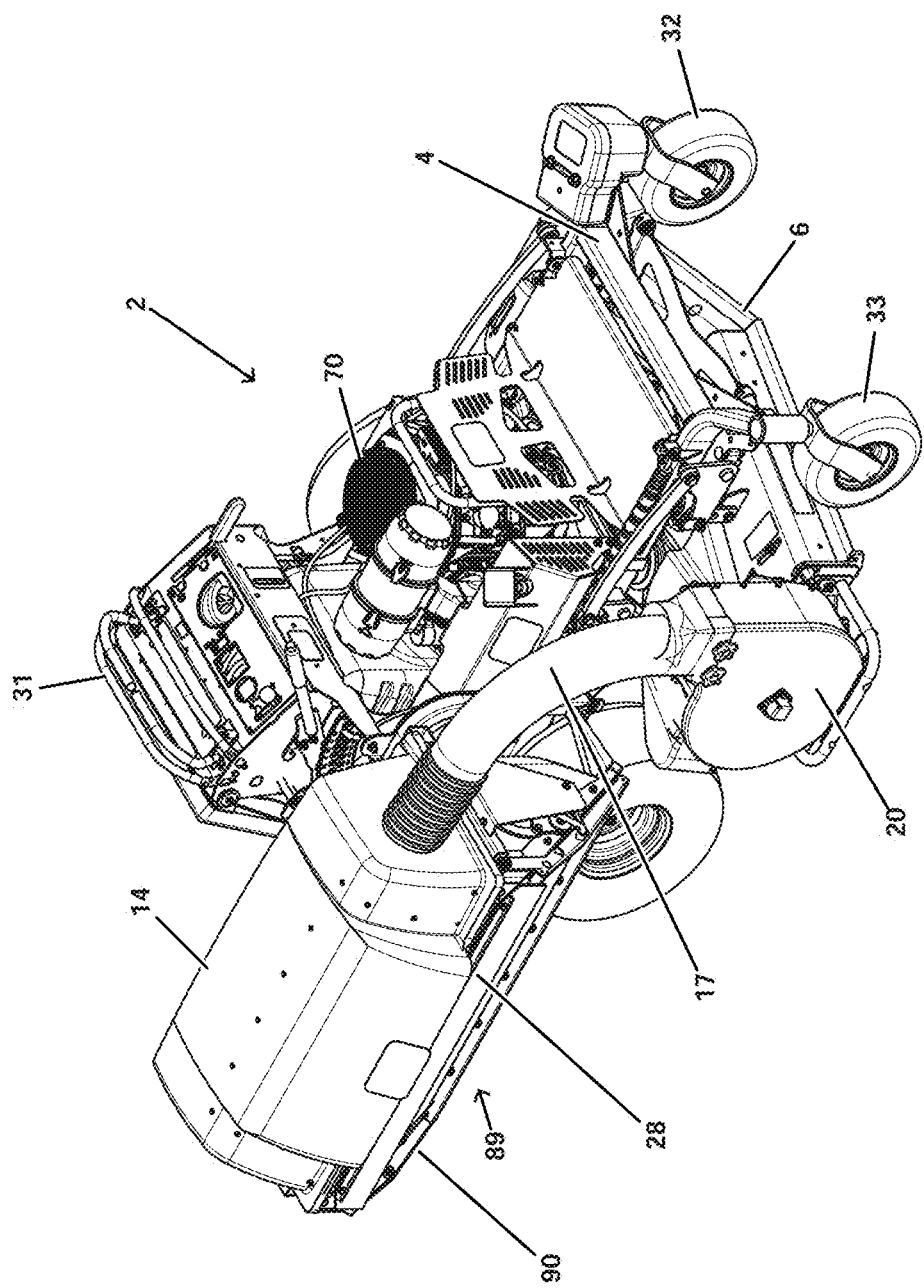
FIG. 11 is a perspective view of an alternative embodiment for a bagger apparatus for use with a stand-on mower.

With reference now to FIGS. 8-10, the hood 14 may be attached to the pivot frame 87 that is, in one embodiment, pivotally attached to the rail 25 protruding from the beam 34.

The pivot frame 87 allows the hood 14 to move between the open position (shown in FIG. 8) and the closed position (shown in FIG. 9). The pivot frame 87 rotates about the pivot 88 as shown in FIGS. 8-9.

One advantage of embodiments of the present disclosure is that, when the operator removes and replaces the bags 18, 35, he/she need not disengage/remove and engage/reattach the duct 17 from the hood 14 of the bagger 12. This benefit is attributable to the flexibility and configuration of the duct 17. This feature may yield significant time savings, especially during jobs that require frequent emptying of the bags 18, 35. Each bag 18, 35 may include a hook 58 that engages a corresponding pocket 69 (see FIG. 7) in the beam 34 to permit reattachment of the bags 18, 35 to the frame assembly 57.

FIG. 10 is an enlarged view of the pivot frame 87, as viewed from the opposite side shown in FIGS. 8 and 9. As shown in this view, the pivot frame 87 may include a spring 27. The spring 27, which remains in tension at all times, may assist in retaining the hood 14 (i.e., the pivot frame 87) in the open position as the upper spring anchor (see FIG. 10) travels over center of the pivot 88 (hidden by spring 27 in FIG. 10). The spring 27 thus biases the hood either up or down (to the open or closed position) depending on what side of center the spring is on (i.e., on what side of an axis of the pivot 88 the centerline of the spring resides). For example, when an angle of the hood 14 is about 30 degrees from horizontal, the spring 27 may transition from biasing the hood upwardly to biasing the hood downwardly.

FIGS. 8 and 9 illustrate the hood and pivot frame 87 in the open position and the closed position, respectively. The pivot frame 87 is pivotally connected to the rail 25 (see FIG. 10) such that it may pivot about an axis of the pivot 88 between a lowered position (corresponding to the closed position of the hood 14 in which the hood 14 rests upon the top edge of the bags 18, 35 as shown in FIG. 9), and a raised position (corresponding to the open position of the hood 14 in which the hood is rotated upwardly such that the operator can easily empty the bags 18, 35 as shown in FIG. 8). The rear wall 81 of the hood 14 may include a handle 86 (see also FIGS. 4 and 5) to facilitate movement of the hood by the operator.

In the embodiments illustrated herein, the bagger 12 includes the removable frame assembly 57 that attaches the bagger to the traction frame 4. While described with some degree of specificity, the bagger/frame assembly could be configured in any suitable way, e.g., with pins, bolts, brackets, or other types of fasteners that permit the desired attachment/detachment functionality. Stated alternatively, the illustrative embodiments (see, e.g., FIG. 7) show only an exemplary mounting frame assembly 57 and bagger 12. Other embodiments are certainly possible without departing from the scope of this disclosure.

FIGS. 11-16 illustrate alternative embodiments of a bagger apparatus according to the present disclosure. This alternative bagger 89 has a hopper or bin 90 to receive clippings generated by the mower cutting deck 6. Like the bagger 12, the bagger 89 may be mounted to a traction frame 4 and mower 2 as already described herein with respect to the embodiments of FIGS. 1-10.

The bagger 89 may be configured to mount on a traction frame 4 that contains several standard components described above, such as the engine 70. In addition, several bagger components may be similar or identical to corresponding components in embodiments of FIGS. 1-10. For example, the bagger 89 of FIGS. 11-16 may including a hood 14, duct 17, impeller assembly 20, and fill indicator (not shown). The upper hood 14 is sized and configured to cover the hopper 90 in an arrangement similar to the hood 14 of the bagger 12.

The hopper 90 may be formed by several walls, as well as an angled discharge door 28. The hopper 90 includes not only the discharge door 28 (which forms an exterior outboard wall of the hopper), but also front and back walls 97 that are substantially vertical, and an interior side wall 98 (see FIG. 15) proximate the traction frame 4. These walls 97, 98, and 28 together define an interior chamber of the hopper. Each of the walls 97, 98 may include an upper vertical segment and an angled lower segment, the latter angling downwardly from the bottom of the vertical segment. This configuration may help direct cuttings toward the discharge door 28.

The walls 97, 98 may be made of a solid material, and the discharge door 28, which has an angled, bottom surface, may be constructed from a flexible webbed material.

Figure 15:
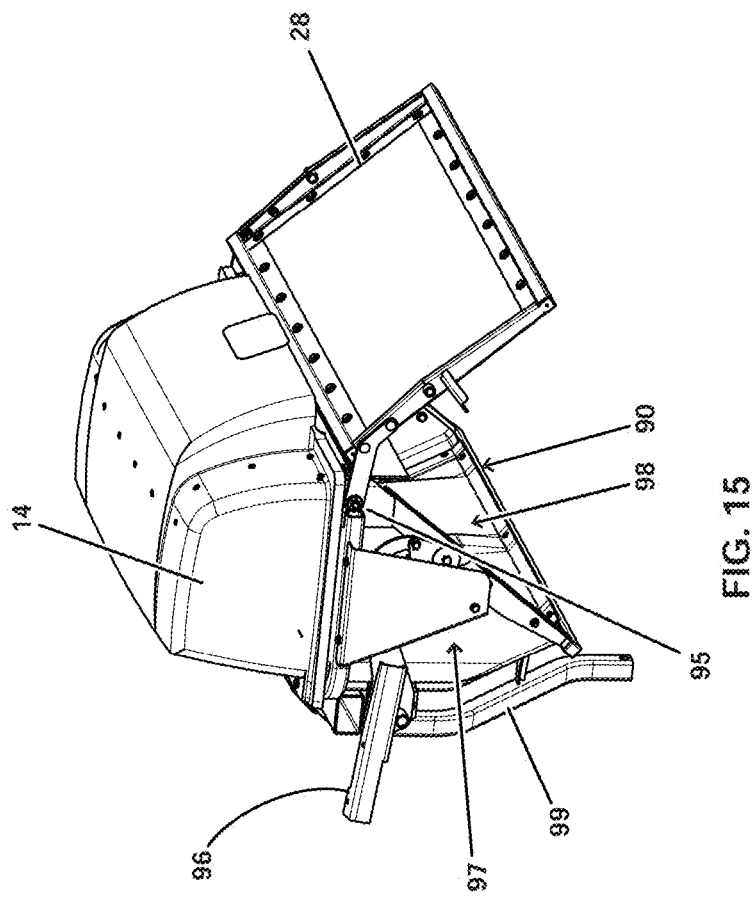
FIG. 15 is a perspective view of a portion of the bagger apparatus shown in FIGS. 11-14.

When the hopper 90 is full of clippings, the operator lifts a handle to open the door 28 to a position shown in FIG. 15. The discharge door 28 may form a plane, and the difference between the angle of the door's plane in its open position (shown in FIG. 15) and the angle of the door's plane in its closed position (shown in FIG. 14) is approximately 90 degrees.

Figure 12:
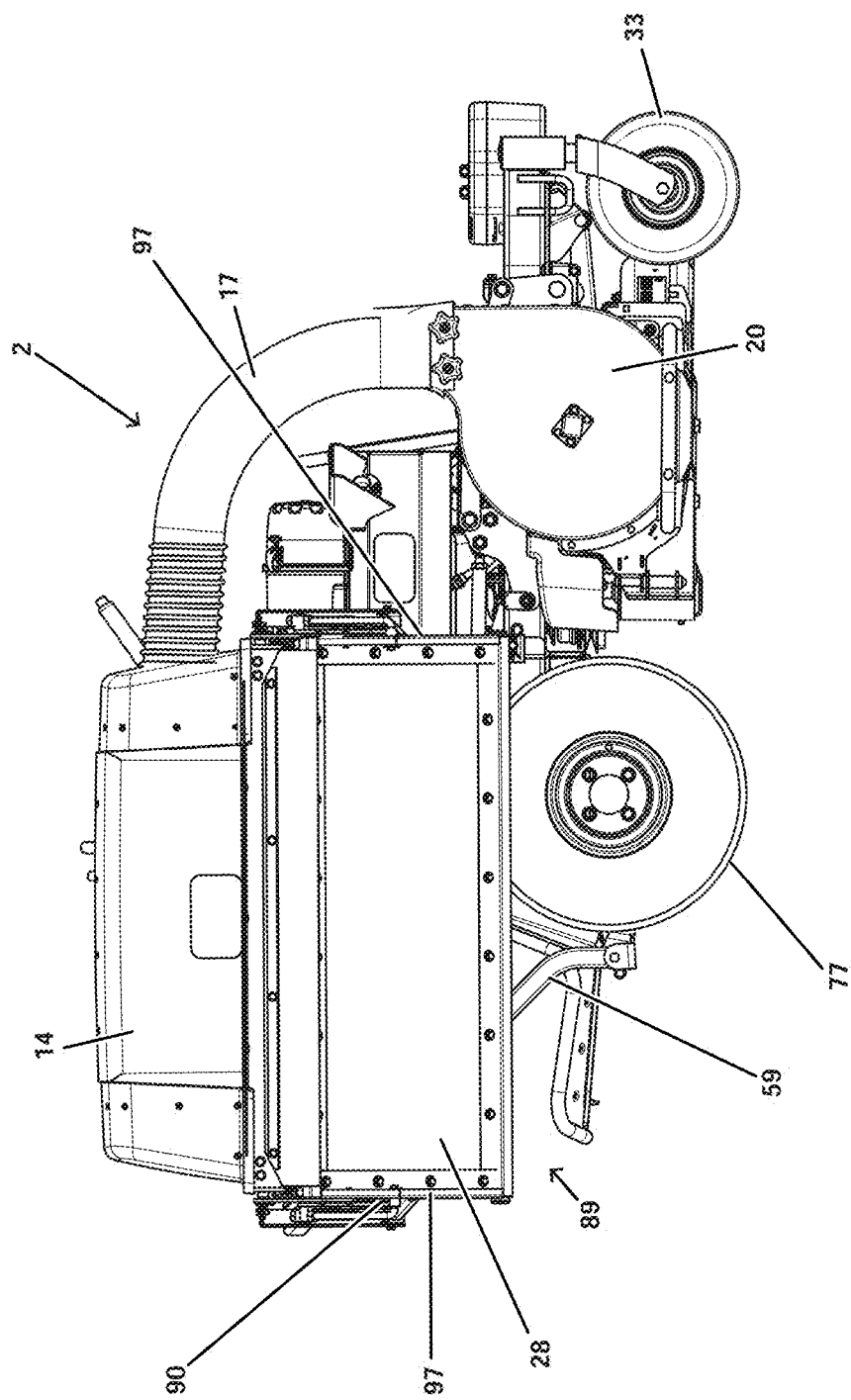
FIG. 12 is a right side elevational view of the mower and bagger shown in FIG. 11.
Figure 13:
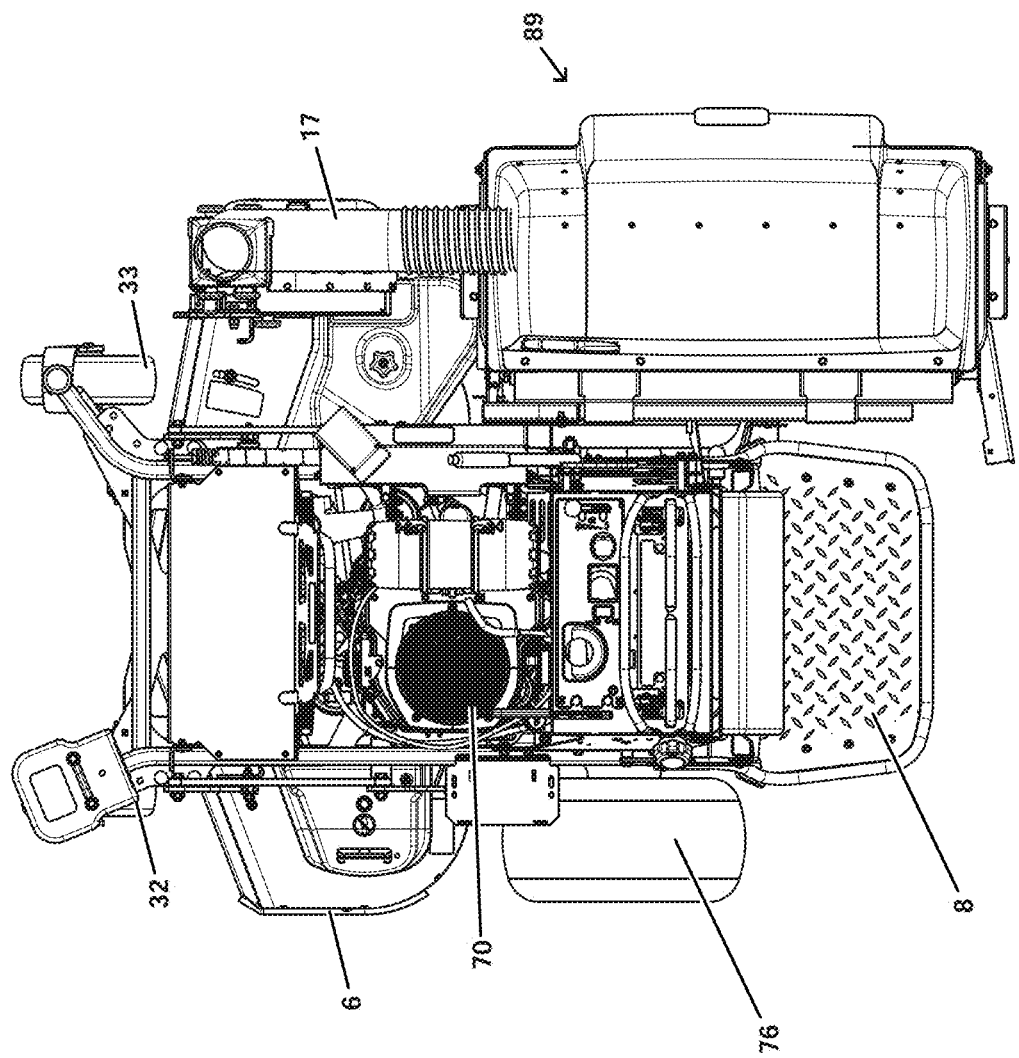
FIG. 13 is a top plan view of the mower and bagger apparatus shown in FIG. 11.
Figure 14:
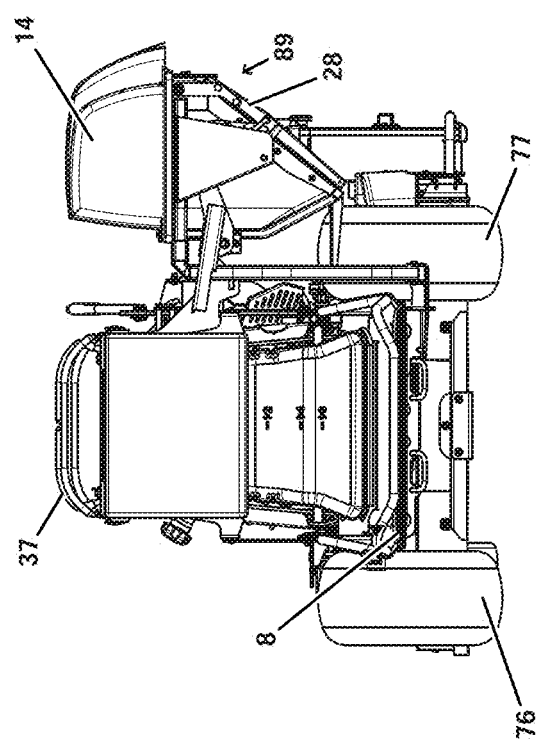
FIG. 14 is a rear elevational view of the mower and bagger apparatus shown in FIGS. 11-13.
Figure 16:
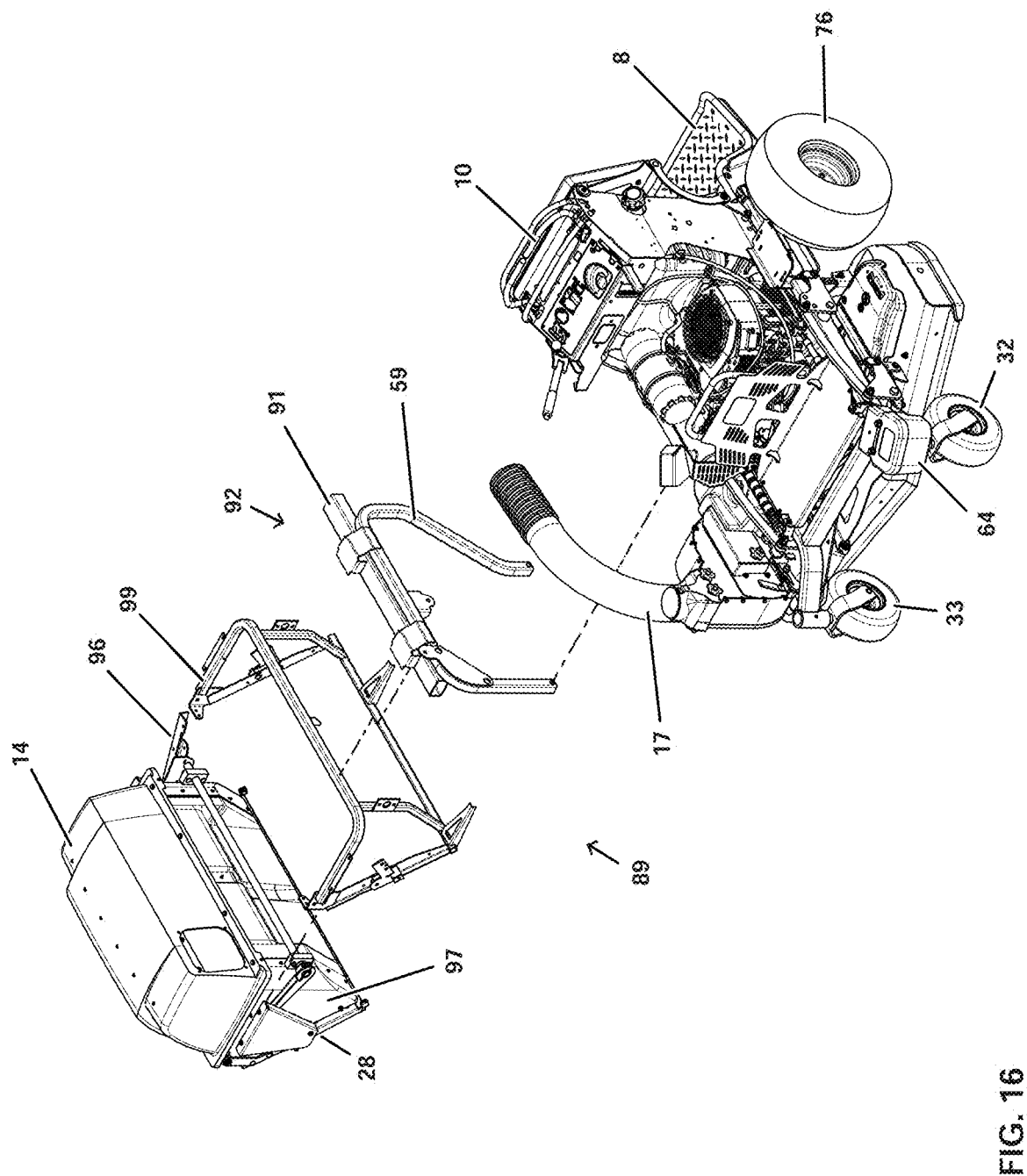
FIG. 16 is an exploded, perspective view of the mower and bagger apparatus shown in FIGS. 11-15.

After the clippings are dumped at the appropriate location and the hopper 90 is empty, the operator may close the door 28 to the position shown in FIGS. 12 and 14. In one embodiment, a handle (not shown) may provide leverage to the operator when he/she rotates the discharge door 28. With this design, the handle is lifted to open the door 28 and empty the hopper 90.

As described above, the hopper 90 may include the discharge door 28 that pivots between the open position (shown in FIG. 15) and the closed position (shown in FIGS. 12 and 14). The discharge door also includes a hinge 95 that is proximate the lower portion of the hood 14 in one embodiment.

As stated above, a handle may be provided to facilitate movement of the discharge door 28. The handle may be removably mounted within a receiver 96 on the bagger 89. When the bin 90 is full of clippings, the operator may lift the handle (e.g., without exiting the platform), which releases the discharge door 28 and allows the clippings to exit downwardly. The operator may then remove the clippings with a commercial vacuum or another device.

A mounting frame assembly 92 (see FIG. 16) for the bagger 89 is similar to the mounting frame assembly 57 described with respect to the embodiment of FIGS. 1-10. For example, both mounting frame assemblies 57, 92 include a rear strut 59 that extends from a horizontal beam (see, e.g., 91 in FIG. 16) to a mount attached to the traction frame aft of the traction wheel 77 (see FIG. 12). A rigid mounting bracket may be secured to a lower portion of the hopper 90. The mounting frame 92 has a beam 91 that is similar to the beam 34 already discussed herein; however, the beam 91 has no pockets since the bagger 89 has no grass bag hooks. The hopper 90 includes a framework 99 that is sized and configured for the hopper 90 and mounting frame 92.

In one embodiment, the hopper 90 has a capacity of six to seven bushels. As one may appreciate, the hopper 90 may provide various benefits, including, for example, ease with which clippings are dumped from the bagger. That is, unlike the bagger 12, the operator need not lift bags up and out of the bagger 89.

The steps for attaching the bagger 89 to the control tower 63 are essentially the same as the attachment steps for the bagger 12 already described above. However, the bagger 89 may not require hooks that engage with pockets in the beam 34; rather, the bagger 89 may attach to the frame with suitable brackets and pins.

The disclosure is not limited to the designs described in the detailed description or depicted in the drawings. Various modifications will be apparent to those skilled in the art. Accordingly, the disclosure is limited only by the appended claims, and equivalents thereto. Moreover, it is understood that the claims are not limited to the illustrative embodiments set forth herein.

What is claimed is:

1. A ride-on lawn mower comprising:
a traction frame comprising a front end and a rear end, the rear end spaced-apart from the front end along a longitudinal axis of the mower;
rear wheels adapted to support a portion of the traction frame upon a ground surface, wherein the rear wheels define rearward-most ground engaging members of the ride-on lawn mower;
a support platform connected to the traction frame and adapted to support a standing operator, wherein at least a portion of the platform is longitudinally located aft of a rotational axis of the rear wheels; and
a bagger connected to the traction frame, the bagger comprising one or more receptacles adapted to receive lawn clippings, wherein at least a portion of one of the one or more receptacles is positioned to a side of the platform and aft of the rotational axis of the rear wheels.

2. The mower of claim 1, further comprising:
a cutting deck attached to the traction frame; and
a duct connected to an outlet of the cutting deck, the duct in fluid communication with the one or more receptacles.

3. The mower of claim 2, further comprising an impeller assembly for directing the lawn clippings from the cutting deck to the one or more receptacles.

4. The mower of claim 1, wherein the traction frame further comprises a control tower extending upwardly at or near the rear end, wherein the control tower extends upwardly to a first elevation above the ground surface and wherein the bagger further comprises a hood that, when in a closed position, forms a top wall of the bagger located at a second elevation above the ground surface that is equal to or greater than the first elevation.

5. The mower of claim 1, wherein the one or more receptacles comprise first and second receptacles, wherein at least one of the first and second receptacles is positioned aft of the rotational axis of the rear wheels.

6. The mower of claim 1, wherein the one or more receptacles define a capacity of at least six bushels.

7. The mower of claim 1, wherein the bagger further comprises:
   a mounting frame assembly that connects the bagger to the traction frame; and
   a pivot frame pivotally connecting a hood of the bagger to the mounting frame assembly, wherein the pivot frame allows movement of the hood, relative to the traction frame, between a closed position and an open position.

8. The mower of claim 1, wherein the one or more receptacles comprise a flexible bag.

9. The mower of claim 7, further comprising a biasing member adapted to bias the hood toward the open position and, alternatively, toward the closed position.

10. The mower of claim 7, further comprising a duct attached to the hood such that the hood is movable between the open position and the closed position without disengagement of the duct from the hood.

11. The mower of claim 1, wherein the bagger further comprises a fill indicator adapted to indicate a level of clippings within the one or more receptacles.

12. The mower of claim 1, wherein the bagger defines a center of gravity that is located proximate the rotational axis of the rear wheels.

13. The mower of claim 1, wherein the bagger is directly connected to the traction frame.

14. A ride-on lawn mower comprising:
   a traction frame comprising a front end and a rear end, the rear end spaced-apart from the front end along a longitudinal axis of the mower, wherein the traction frame comprises a control tower extending upwardly at or near the rear end;
   rear wheels adapted to support a portion of the traction frame upon a ground surface;
   a support platform connected to the traction frame and adapted to support a standing operator, wherein at least a portion of the platform is located at or aft of a rotational axis of the rear wheels; and
   a bagger connected to the traction frame and comprising one or more receptacles configured to receive lawn clippings, wherein at least a portion of one of the one or more receptacles is positioned to a side of the platform and aft of the rotational axis of the rear wheels, and wherein the bagger defines a center of gravity located proximate the rotational axis of the rear wheels.

15. The mower of claim 14, wherein the bagger further comprises a mounting frame assembly that connects the bagger to the traction frame, wherein the one or more receptacles are attached to the mounting frame assembly and located beneath a hood.

16. The mower of claim 15, further comprising:
   a cutting deck attached to the traction frame; and
   a duct connected to an outlet of the cutting deck, the duct in fluid communication with the one or more receptacles, wherein the duct is connected to the hood such that the hood is movable between an open position and a closed position without disengagement of the duct from the hood.

17. The mower of claim 16, further comprising a biasing member operatively connected between the hood and the mounting frame assembly, the biasing member adapted to bias the hood toward the open position and, alternatively, toward the closed position.

18. The mower of claim 16, wherein the control tower extends upwardly to a first elevation above the ground surface and wherein the hood, when in the closed position, forms a top wall located at a second elevation above the ground surface that is equal to or greater than the first elevation.

19. The mower of claim 14, wherein the bagger is directly connected to the traction frame.

* * * * *